(12) United States Patent
Ruiz et al.

(10) Patent No.: US 8,797,878 B1
(45) Date of Patent: *Aug. 5, 2014

(54) MOBILITY-AWARE MESH CONSTRUCTION ALGORITHM FOR LOW DATA-OVERHEAD MULTICAST AD HOC ROUTING

(71) Applicant: University of Murcia, Murcia (ES)

(72) Inventors: Pedro M. Ruiz, Murcia (ES); Antonio Fernando Skarmeta Gomez, Murcia (ES)

(73) Assignee: PCMS Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/693,368

(22) Filed: Dec. 4, 2012

Related U.S. Application Data

(63) Continuation of application No. 12/779,934, filed on May 13, 2010, now Pat. No. 8,325,612, which is a continuation of application No. 11/565,105, filed on Nov. 30, 2006, now Pat. No. 7,719,988.

(60) Provisional application No. 60/740,865, filed on Nov. 30, 2005.

(51) Int. Cl.
*H04W 40/02* (2009.01)
*H04W 40/12* (2009.01)
*H04W 84/18* (2009.01)
*H04L 12/56* (2006.01)

(52) U.S. Cl.
CPC .............. *H04W 40/12* (2013.01); *H04W 84/18* (2013.01); *H04L 45/12* (2013.01); *H04L 45/123* (2013.01)

USPC ............................ 370/238; 370/400; 455/445

(58) Field of Classification Search
CPC ...... H04L 45/12; H04L 45/123; H04W 40/12; H04W 84/18
See application file for complete search history.

(56) References Cited

U.S. PATENT DOCUMENTS

| 5,831,975 | A  | * | 11/1998 | Chen et al. ..................... 370/256 |
| 6,917,985 | B2 | * | 7/2005  | Madruga et al. .............. 709/238 |
| 7,184,421 | B1 | * | 2/2007  | Liu et al. ......................... 370/338 |
| 7,414,977 | B2 | * | 8/2008  | Orlik et al. ..................... 370/238 |
| 8,144,708 | B1 | * | 3/2012  | Ahmed et al. ................. 370/390 |
| 2001/0034793 | A1 | * | 10/2001 | Madruga et al. .............. 709/238 |
| 2003/0005149 | A1 | * | 1/2003  | Haas et al. ..................... 709/238 |
| 2004/0228304 | A1 | * | 11/2004 | Riedel et al. ................... 370/332 |
| 2006/0098607 | A1 | * | 5/2006  | Zeng et al. ..................... 370/338 |

* cited by examiner

*Primary Examiner* — Min Jung
(74) *Attorney, Agent, or Firm* — Condo Roccia Koptiw LLP

(57) ABSTRACT

Data overhead of mesh-based multicast ad hoc routing protocols are controlled by adaptively adding redundancy to the minimal data overhead multicast mesh as required by the network conditions. The computation of the minimal data overhead multicast mesh is NP-complete, and therefore an heuristic approximation algorithm inspired on epidemic algorithms is employed to increase tractability of a solution. A mobility-aware and adaptive mesh construction algorithm based on a probabilistic path selection is provided, which is able to adapt the reliability of the multicast mesh to the mobility of the network. Simulation results show that the proposed approach, when implemented into On-Demand Multicast Routing Protocol (ODMRP), is able to offer similar performance results and a lower average latency, while reducing data overhead between 25 to 50% compared to the original ODMRP.

20 Claims, 16 Drawing Sheets

Example of tree-based multicast forwarding structure

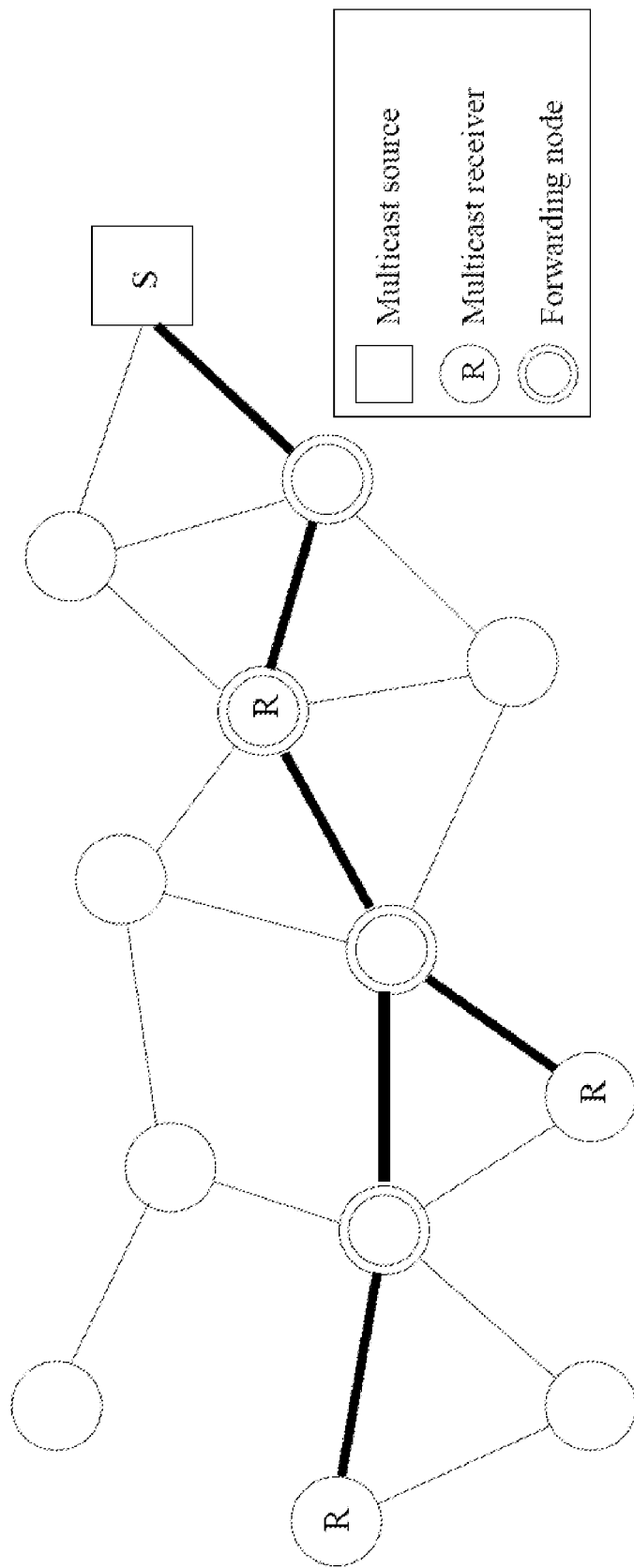
Fig. 1. Example of tree-based multicast forwarding structure

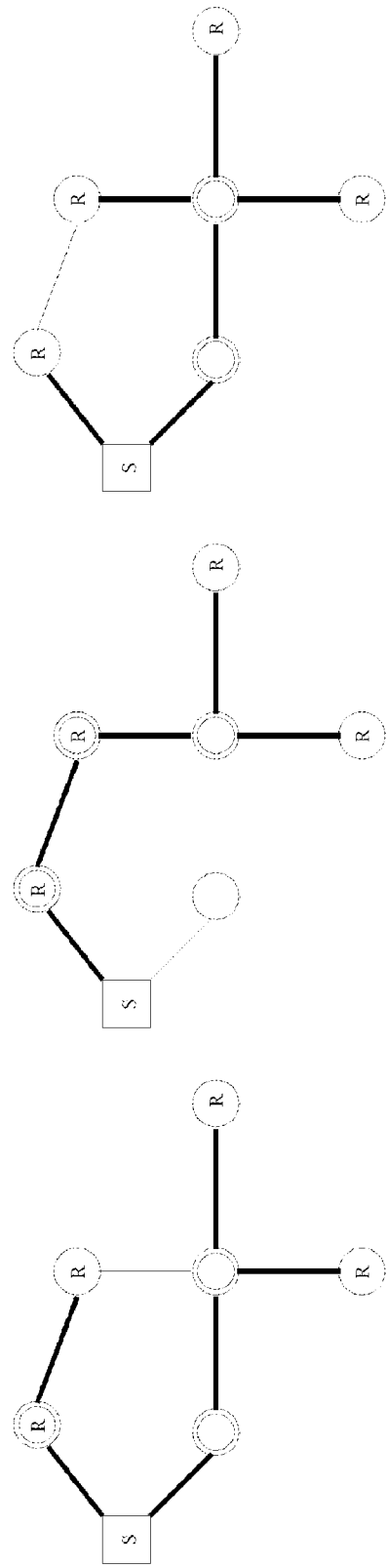
Fig. 2 Differences in cost for several multicast trees over the same ad hoc network

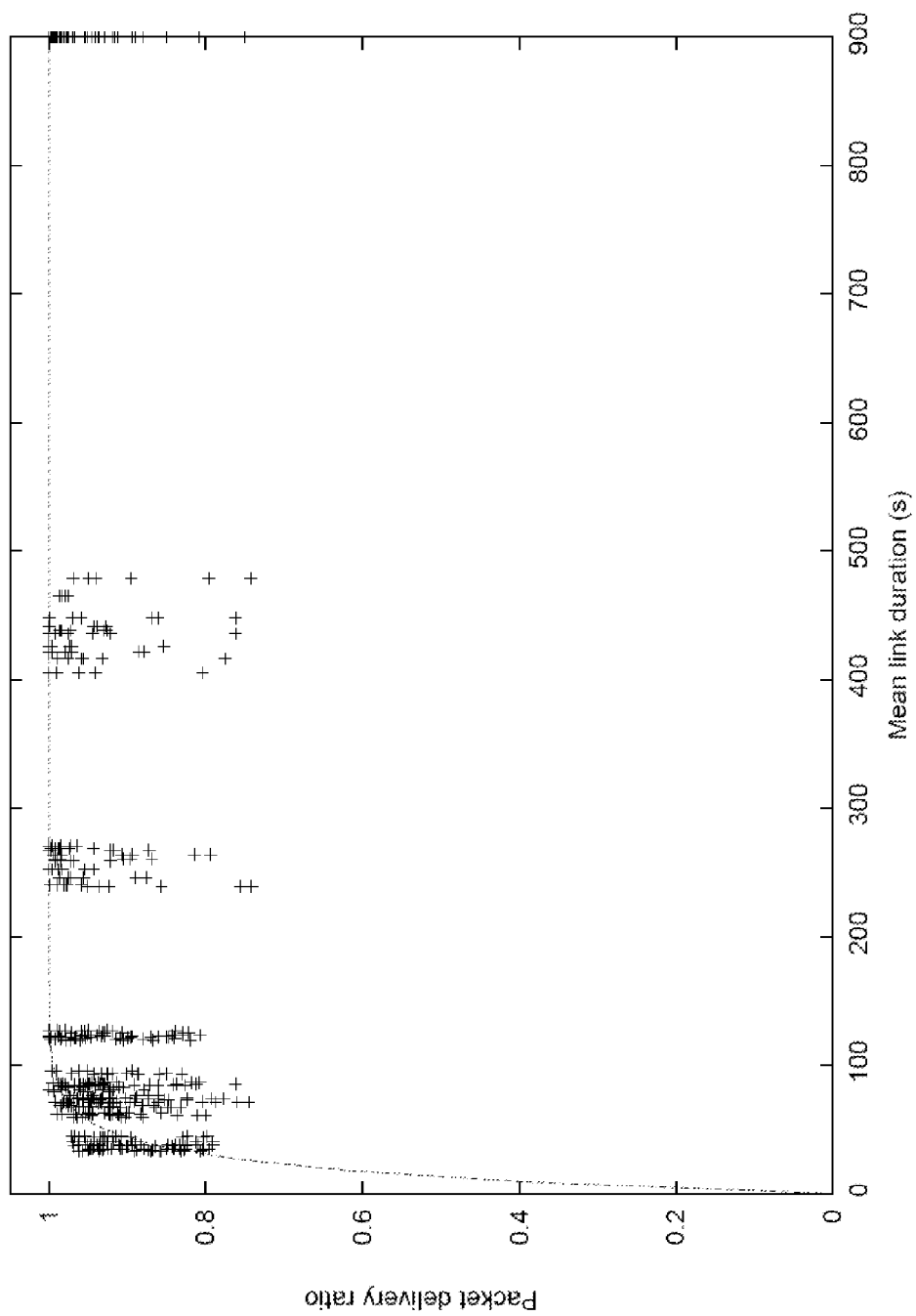
Fig. 3. Packet delivery ratio vs. mean link duration

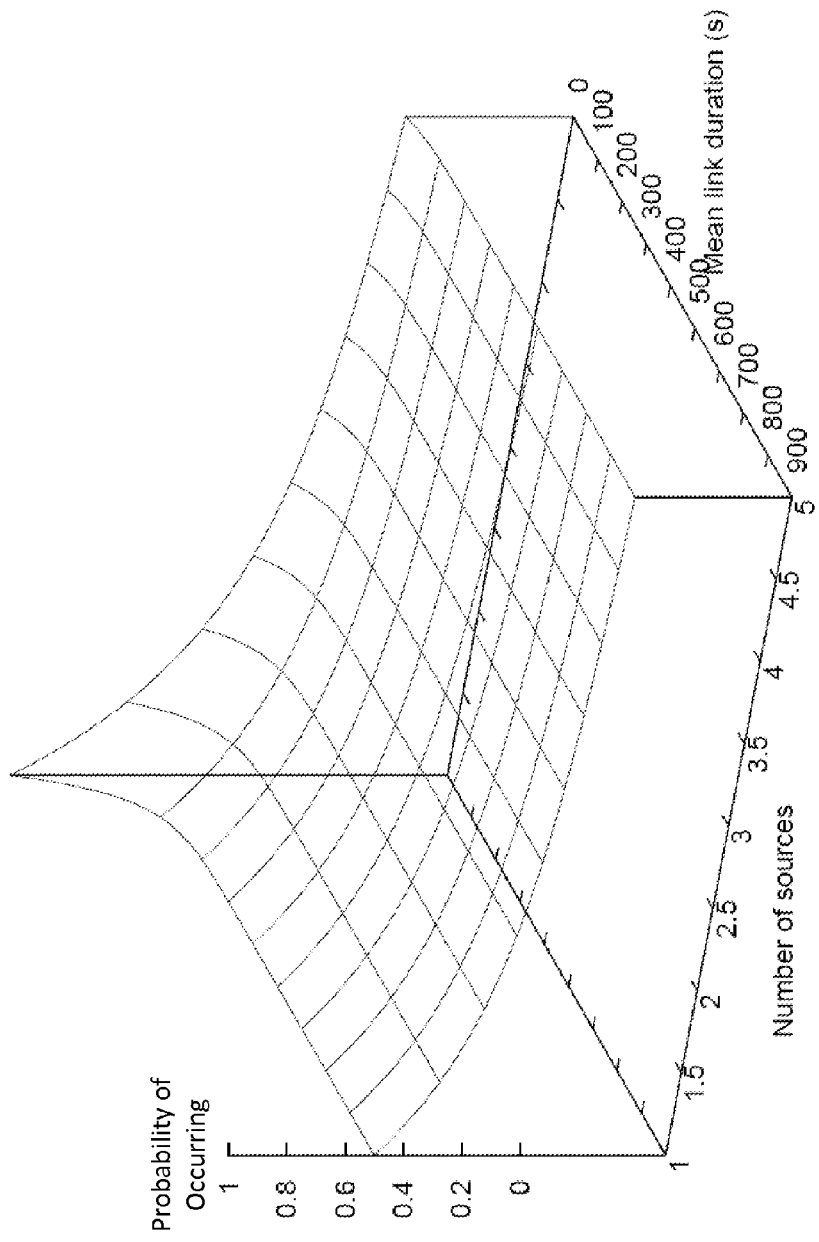
Fig. 4. $\pi(ld_i,|S|)$ values for in the probabilistic path selection

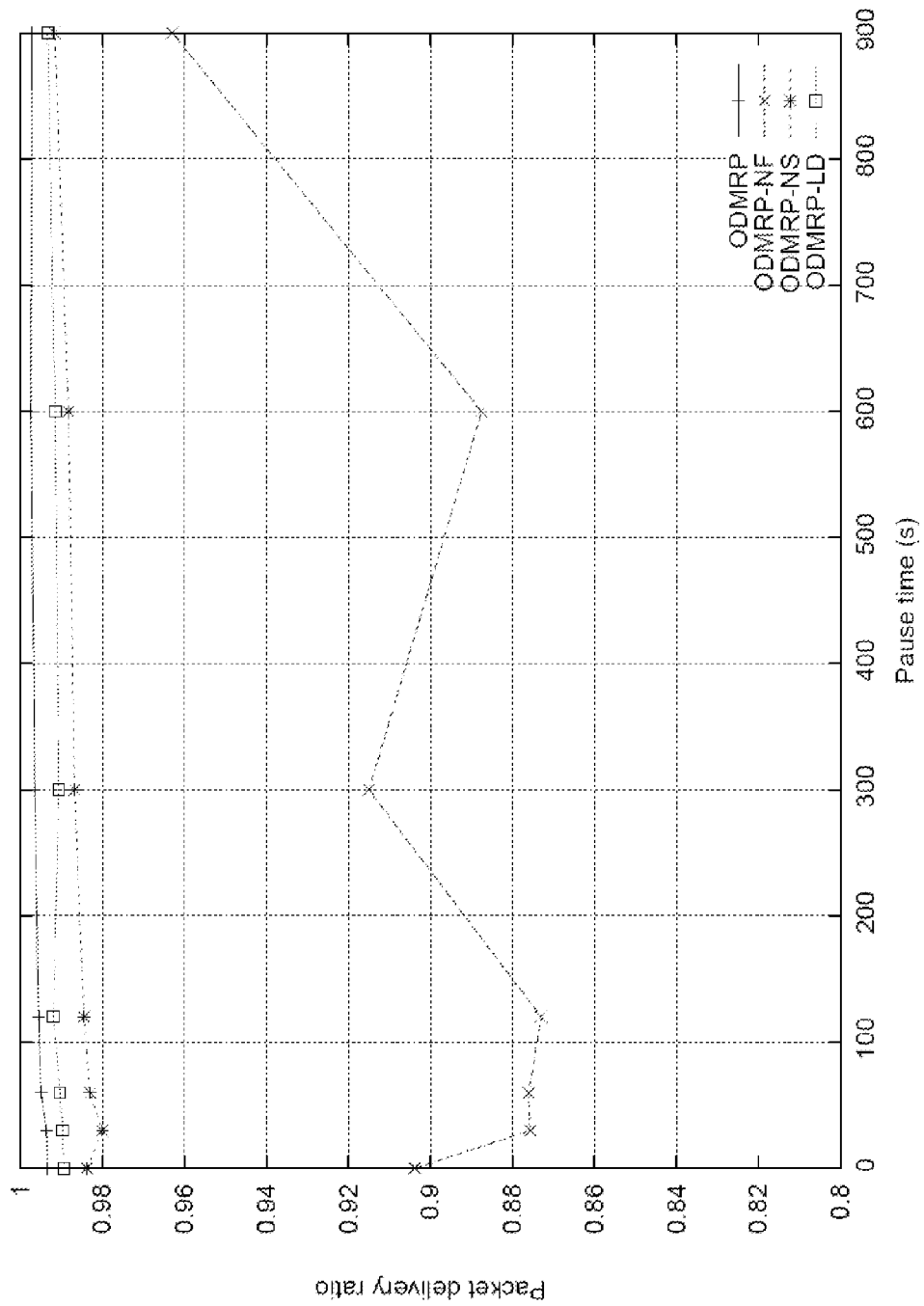
Fig. 5(a) Packet delivery ratio
1 source and 15 receivers

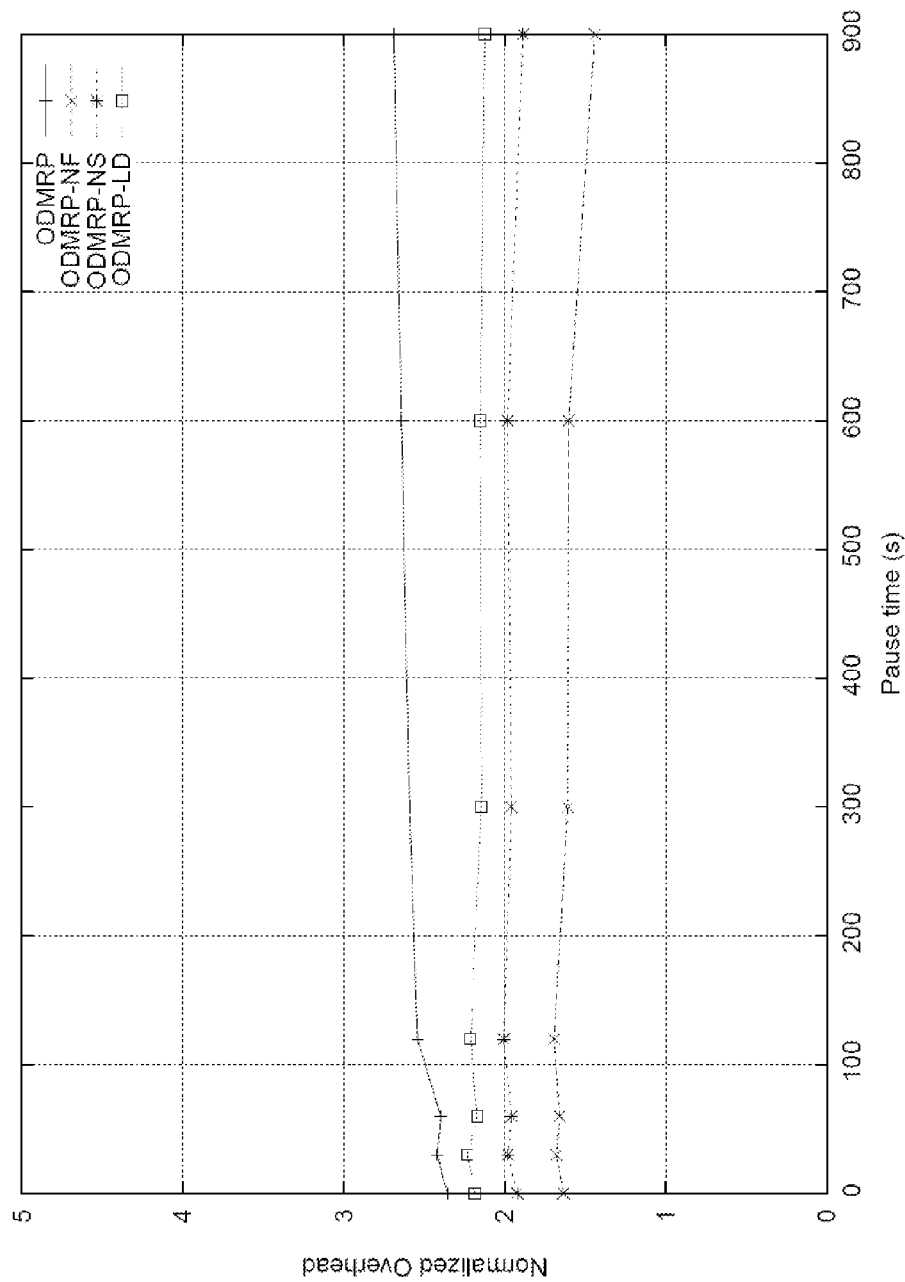
Fig. 5(b) Normalized packet overhead
1 source and 15 receivers

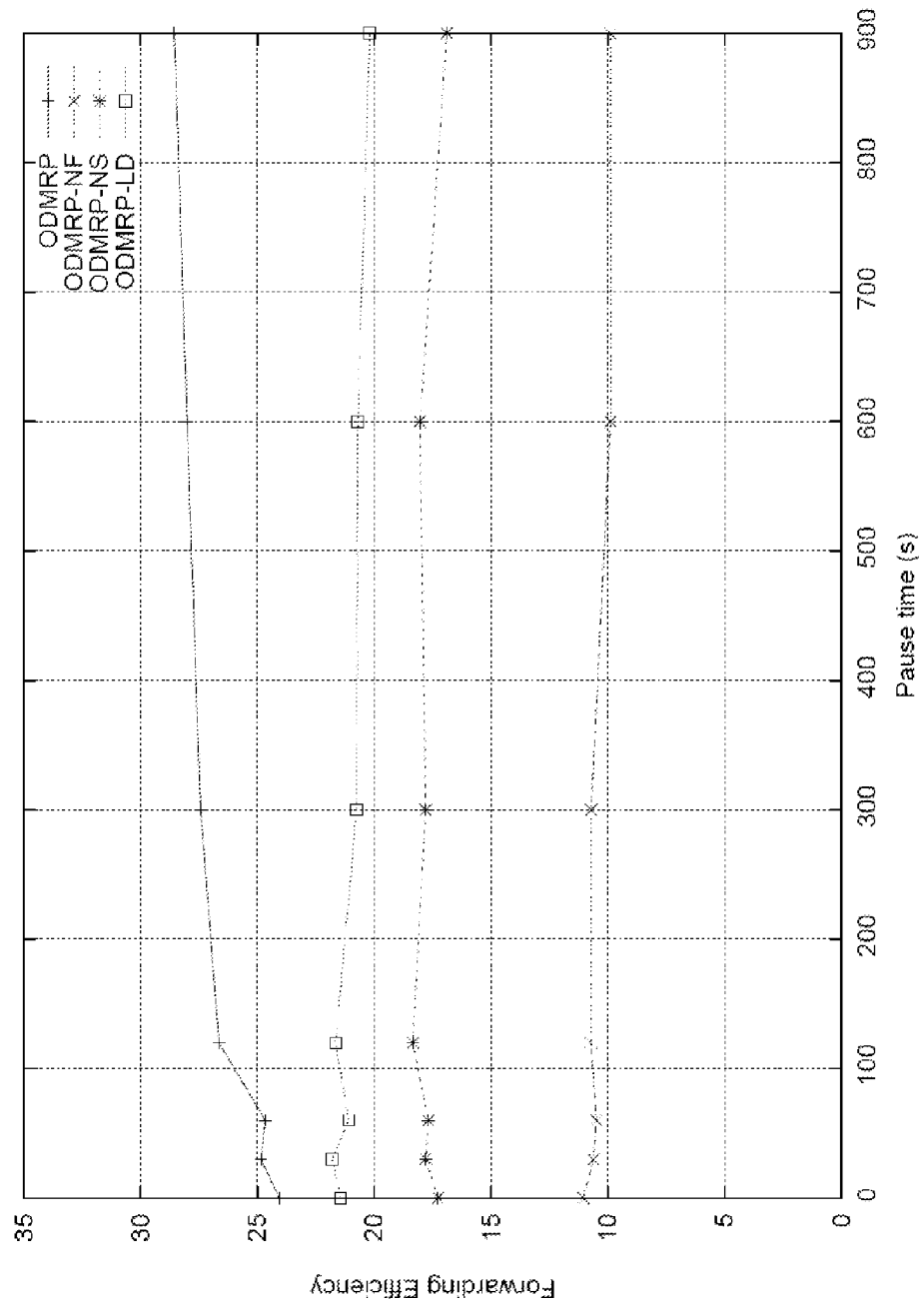
Fig. 5(c) Forwarding efficiency 1 source and 15 receivers

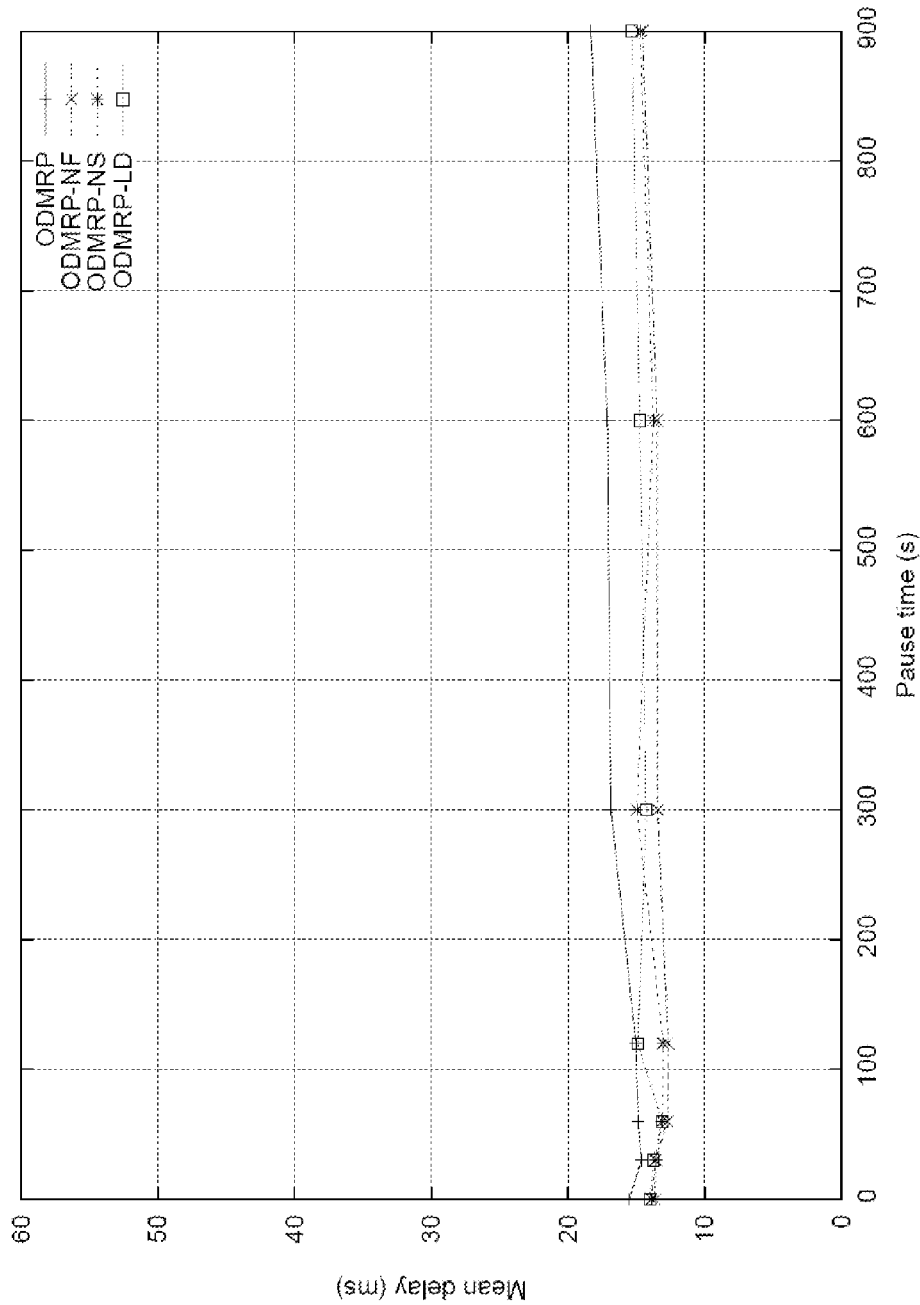
Fig. 5(d) Latency
1 source and 15 receivers

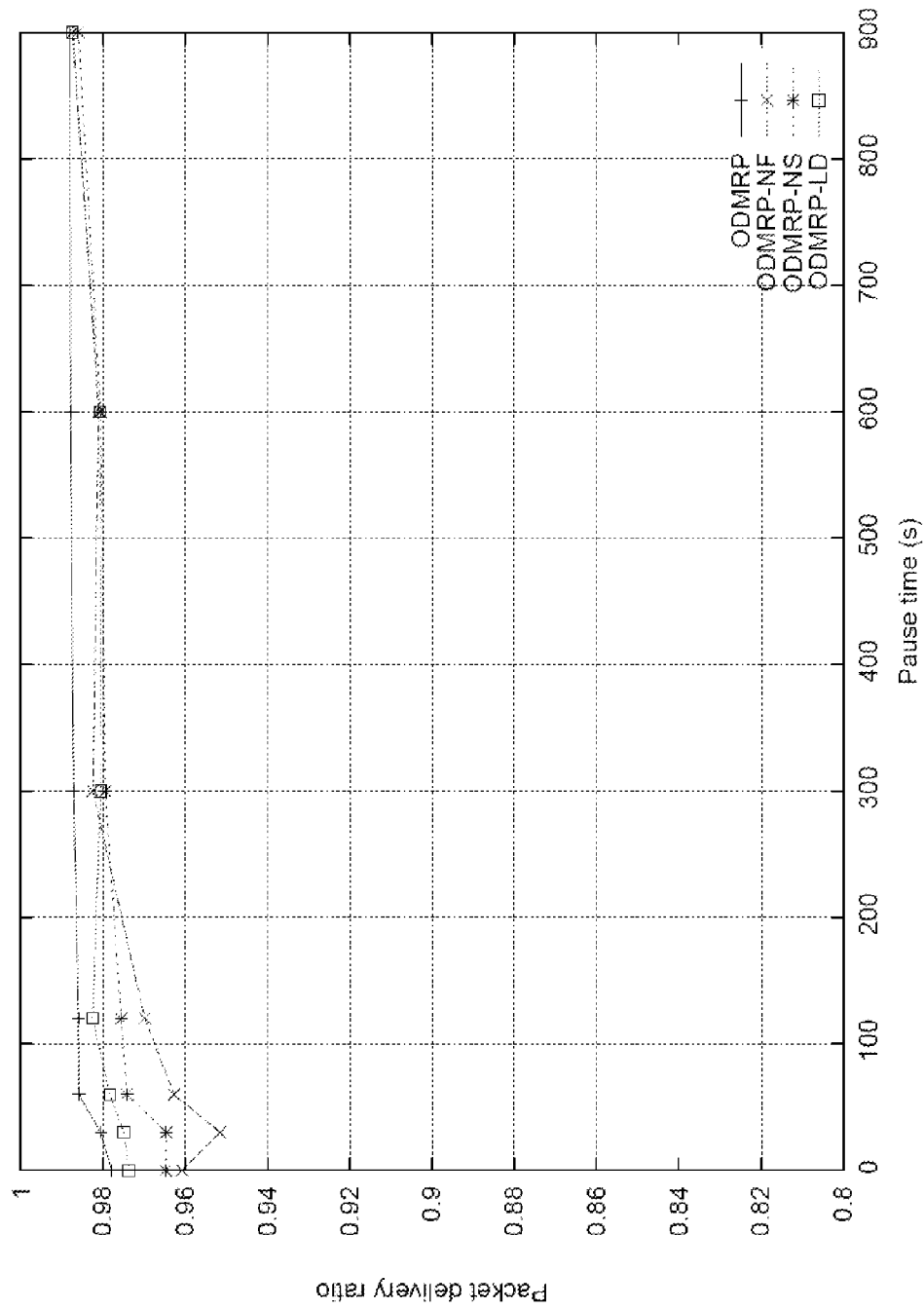
Fig. 6(a) Packet delivery ratio 2 sources and 15 receivers

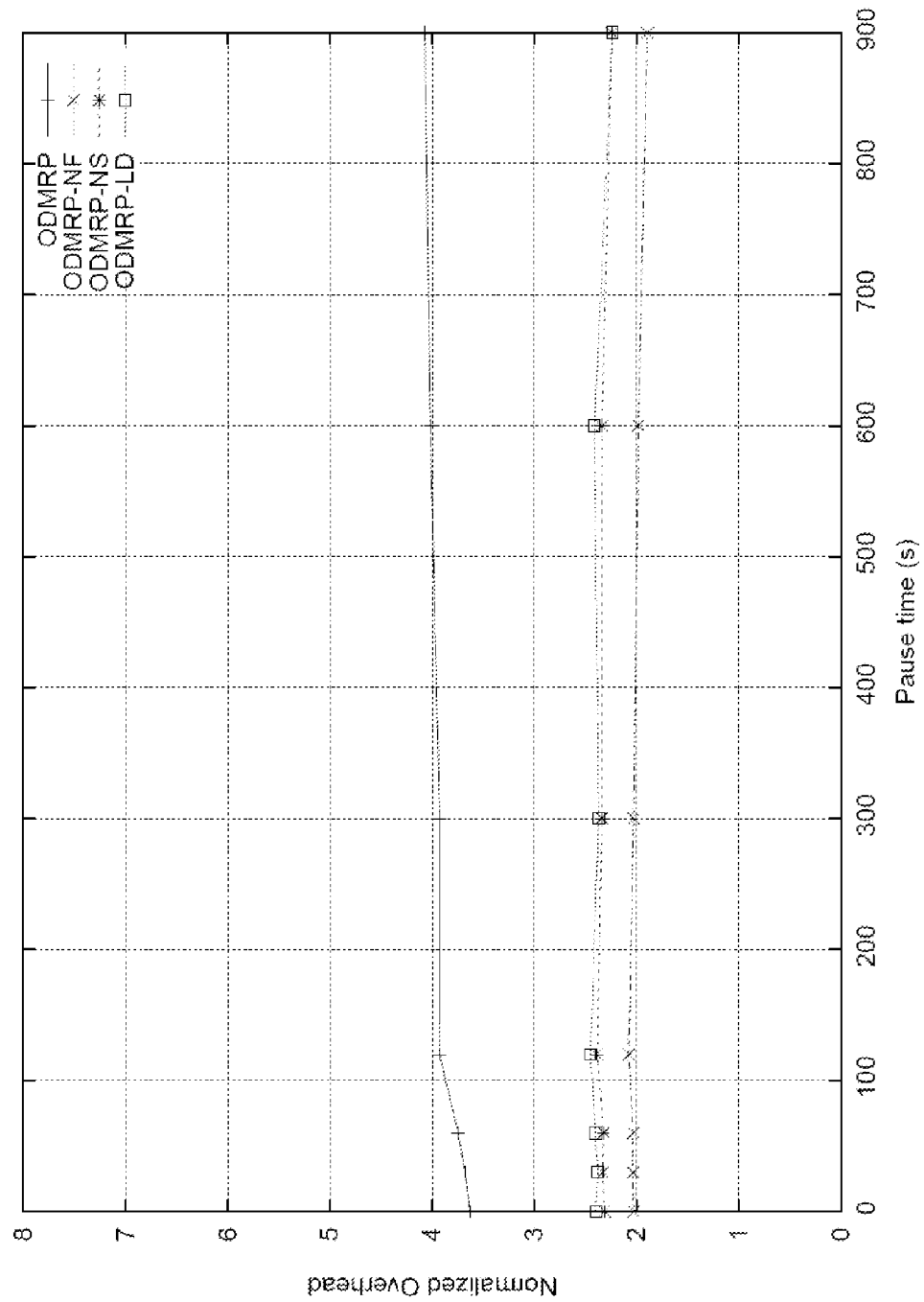
Fig. 6(b) Normalized packet overhead
2 sources and 15 receivers

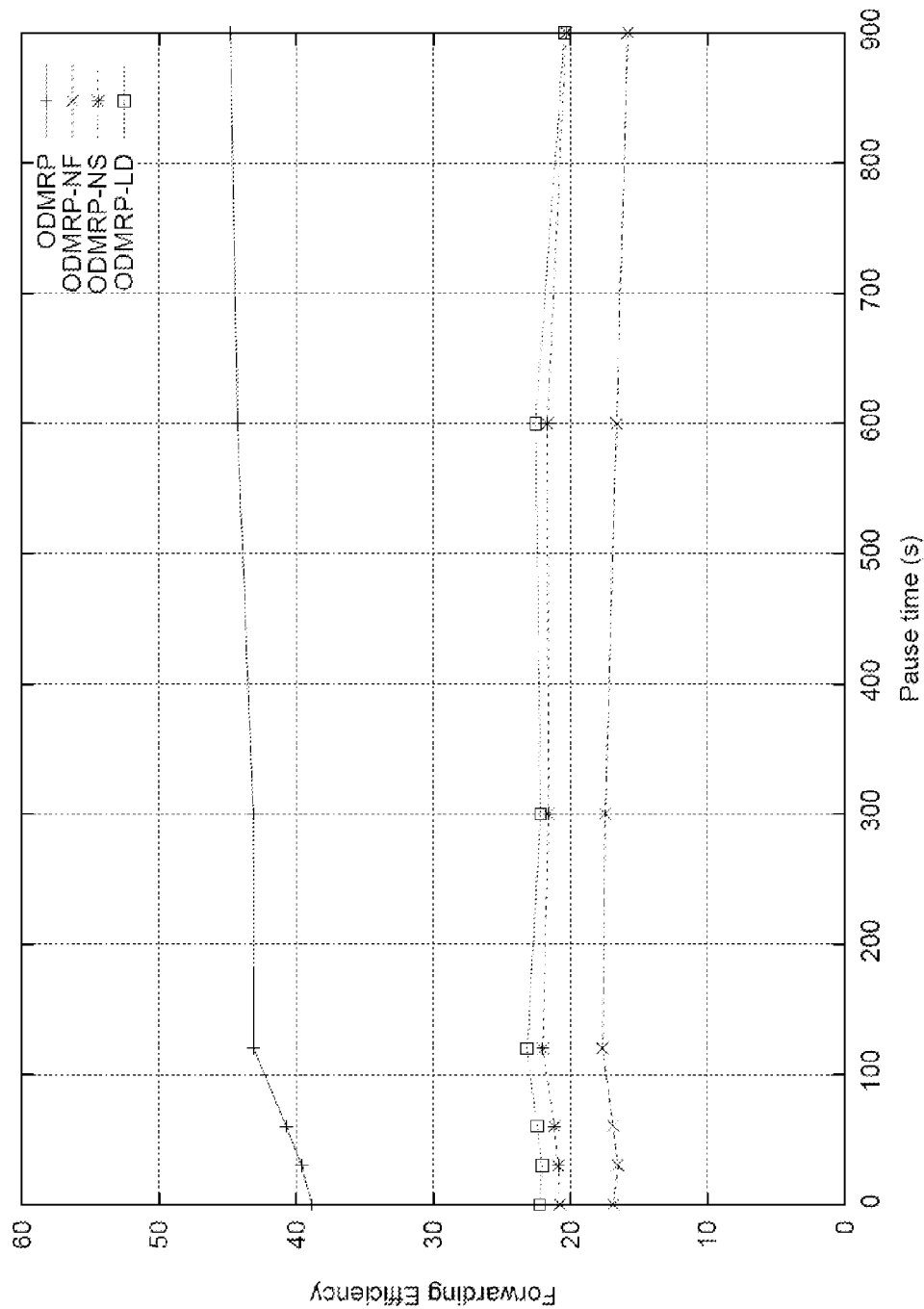
Fig. 6(c) Forwarding efficiency
2 sources and 15 receivers

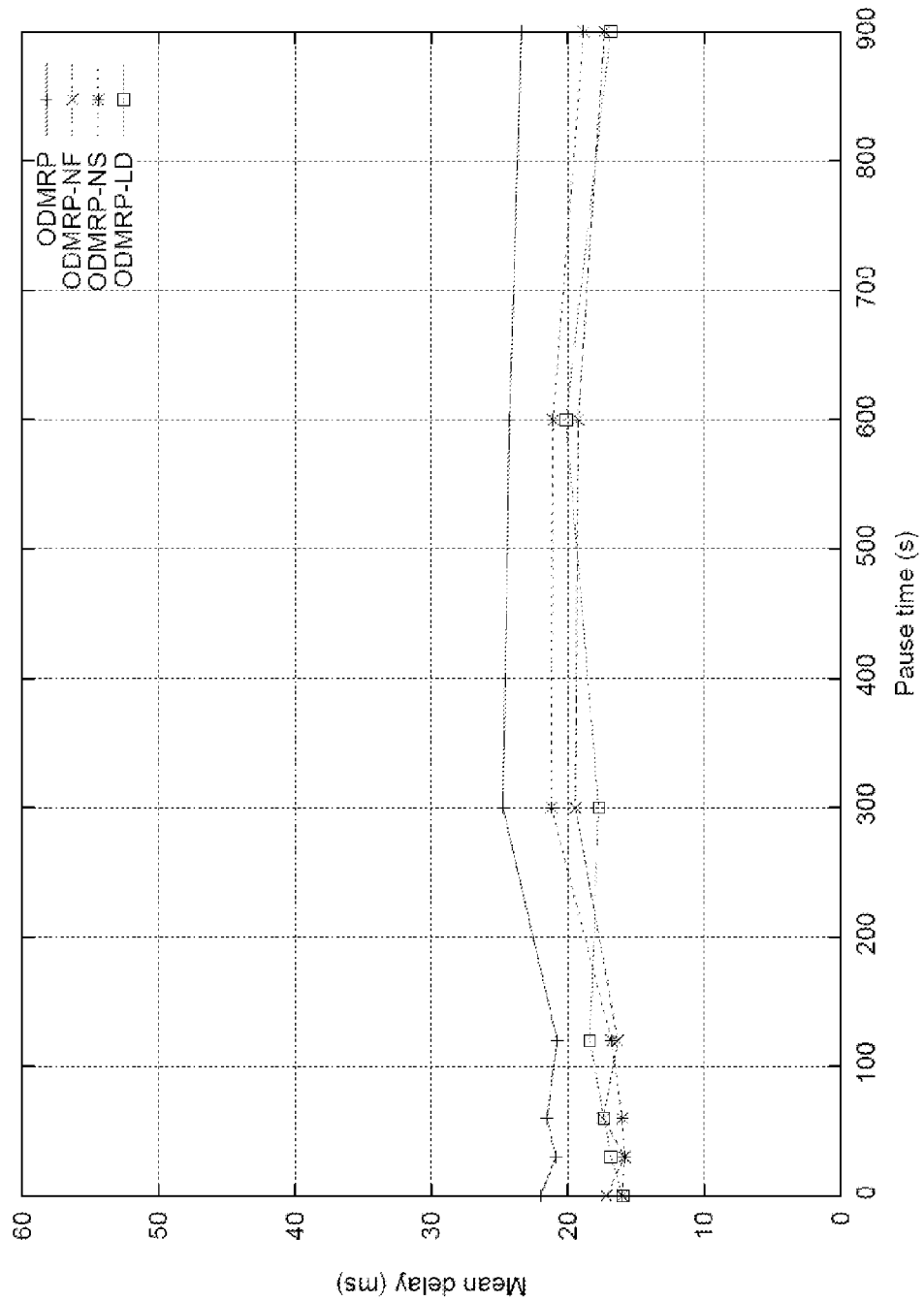

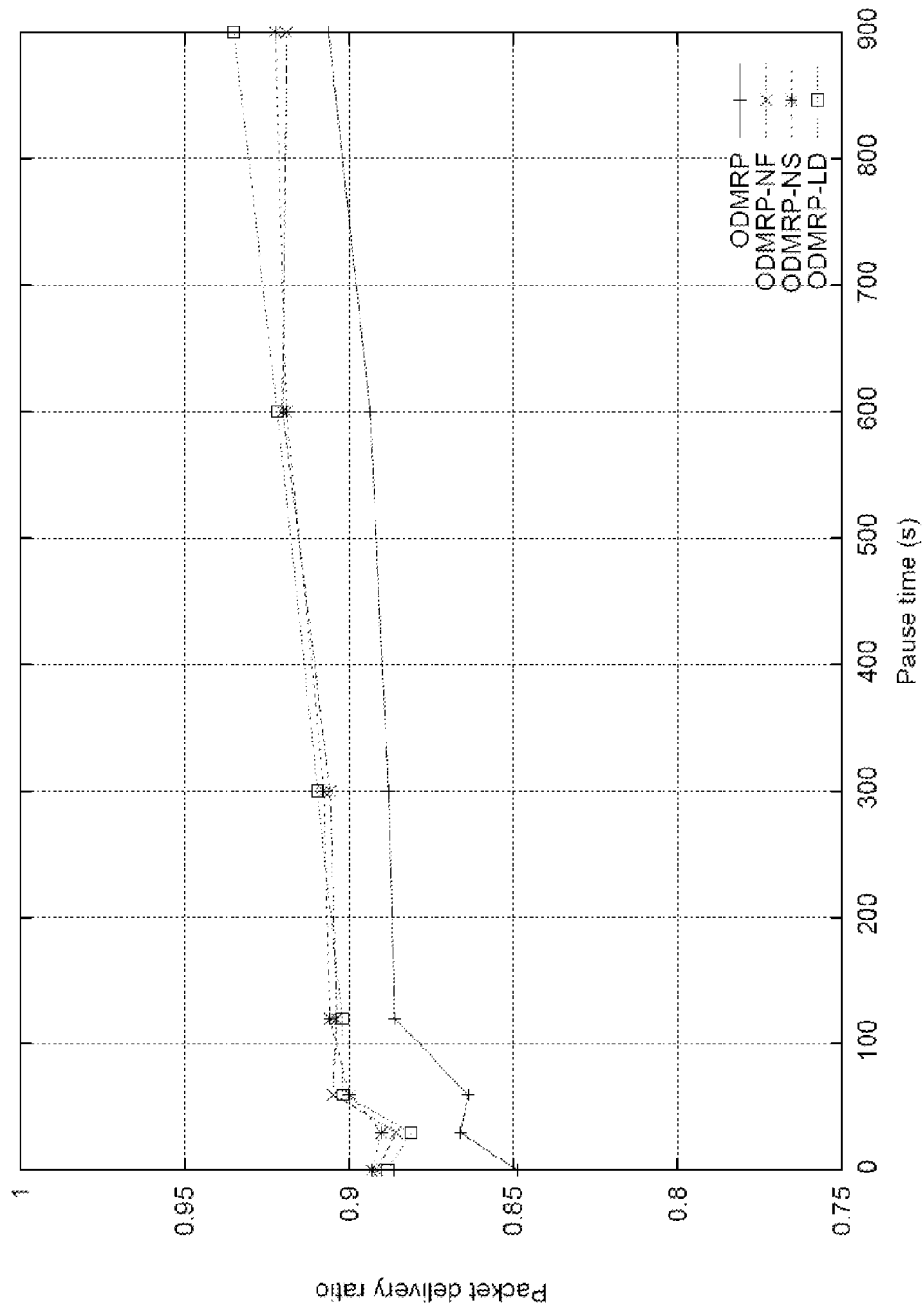
Fig. 7(a) Packet delivery ratio
5 sources and 5 receivers

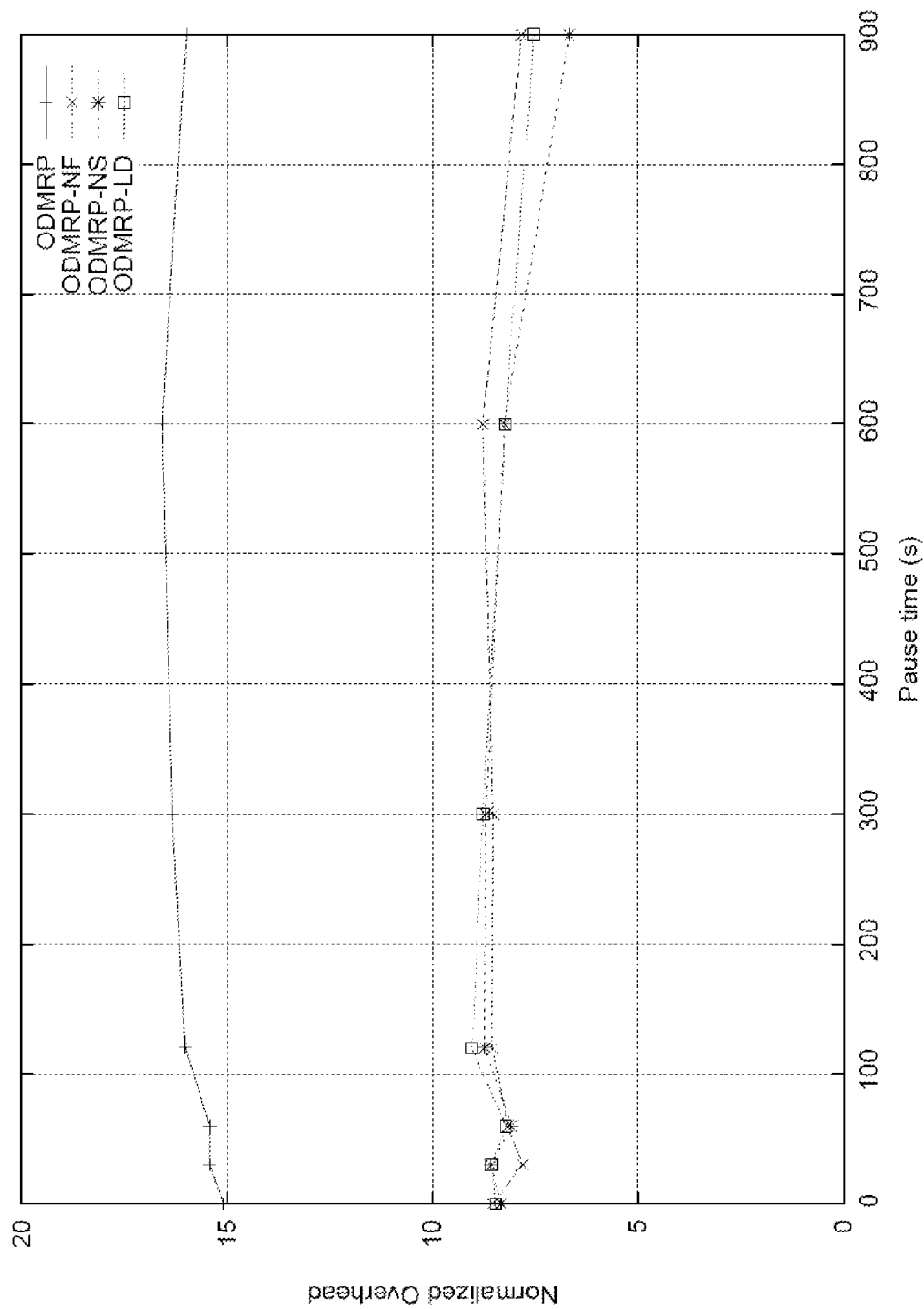
Fig. 7(b) Normalized packet overhead
5 sources and 5 receivers

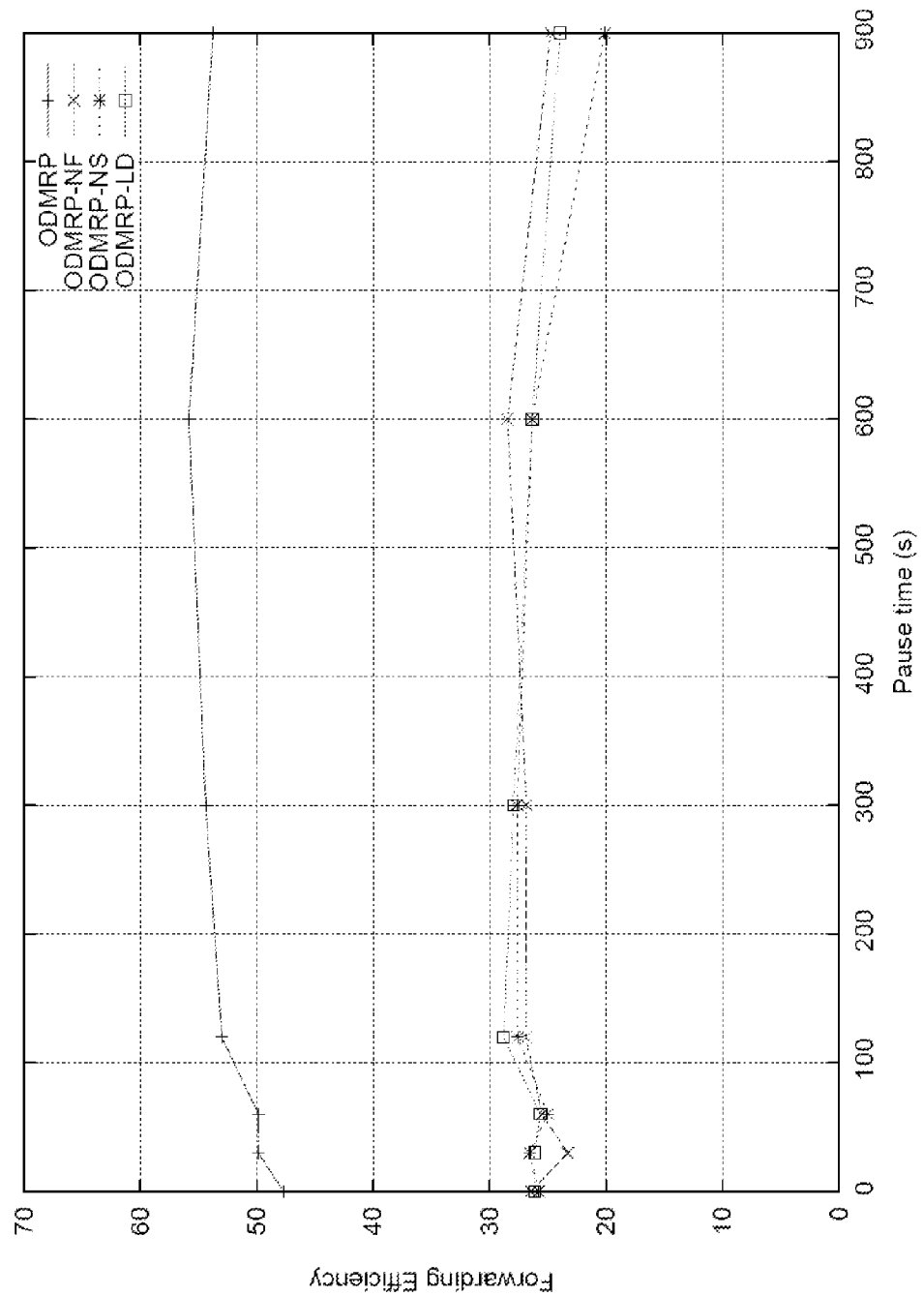
Fig. 7(c) Forwarding efficiency 5 sources and 5 receivers

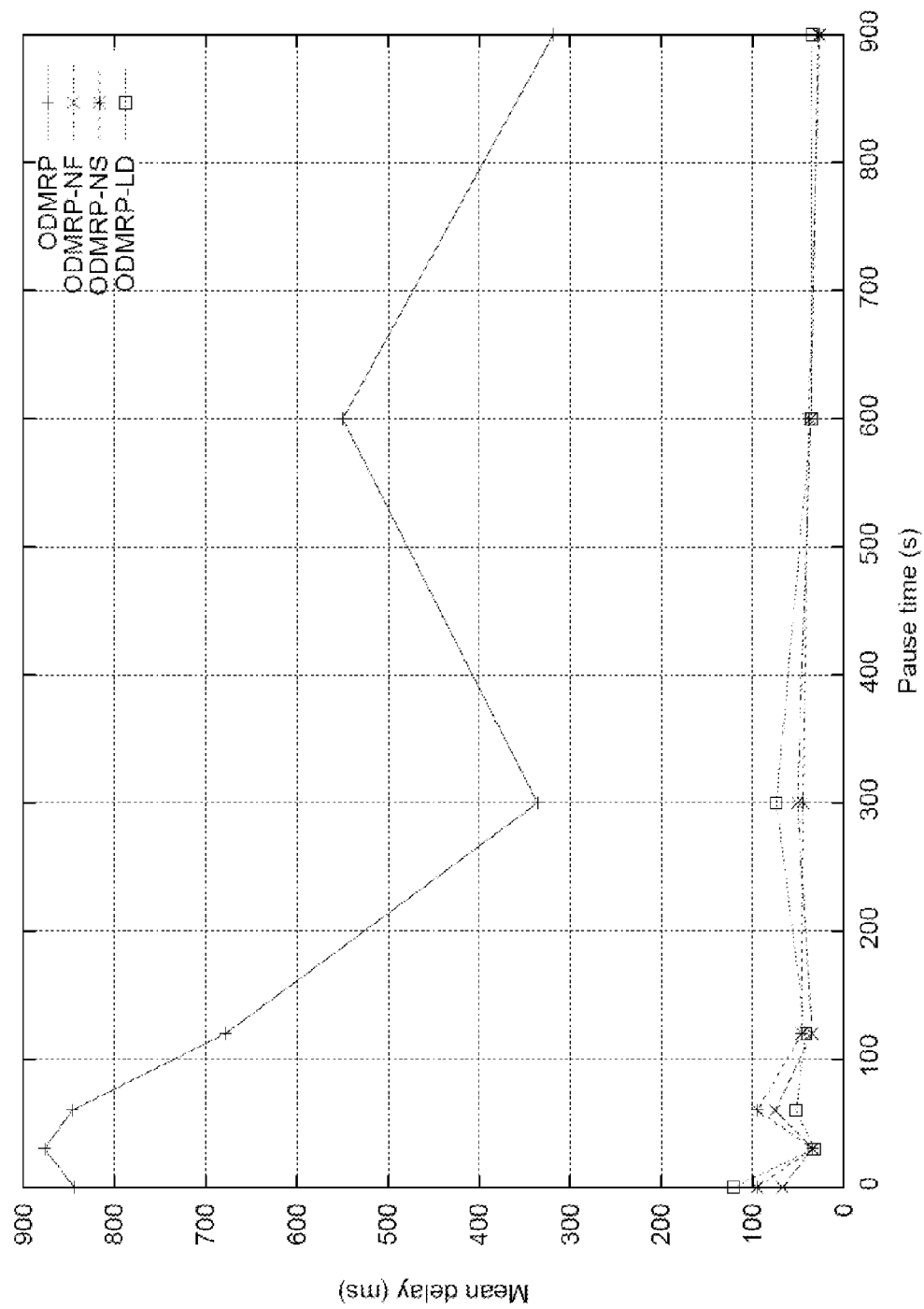
Fig. 7(d) Latency
5 sources and 5 receivers

MOBILITY-AWARE MESH CONSTRUCTION ALGORITHM FOR LOW DATA-OVERHEAD MULTICAST AD HOC ROUTING

RELATED APPLICATIONS

The present application is a continuation of U.S. patent application Ser. No. 12/779,934, filed May 13, 2010, now U.S. Pat. No. 8,325,612, issued Dec. 4, 2012, which is a continuation of U.S. patent application Ser. No. 11/565,105, filed Nov. 30, 2006, now U.S. Pat. No. 7,719,988, which is a non-provisional of U.S. Provisional Patent Application No. 60/740,865, filed Nov. 30, 2005, the entirety of which are expressly incorporated herein by reference.

BACKGROUND OF THE INVENTION

A mobile ad hoc network consists of a set of mobile nodes which are free to move and are interconnected through wireless interfaces. Nodes which are not able to communicate directly, use multihop paths using other intermediate nodes in the network as relays. So, a mobile ad hoc node can act both as a mobile router and a mobile host. In addition, the continuous topology changes, the strong requirements in minimizing battery consumption (in devices which are power constrained) as well as the limited network resources, make the problem of routing in these networks a real challenge. However, their completely distributed nature and their ability to operate without depending upon the deployment of any infrastructure, makes them an ideal component of future mobile computing scenarios. These scenarios include among others emergency situations, battlefield assistance and search and rescue operations. Hence, the interest in mobile ad hoc networks is expected to increase in the future.

Multicast is one of the areas in mobile ad hoc networks which is to play a key role in future wireless networks. Key to this is the fact that most of the application scenarios for mobile ad hoc networks are strongly based on many-to-many interactions and they require a high degree of collaboration among terminals. Many services such as multimedia applications, service discovery and many other bandwidth-avid applications can strongly benefit from the underlying support of efficient multicast communications.

The problem of the efficient distribution of communication traffic from a set of senders to a group of receivers in a datagram network was initially studied by Deering [1]. Several multicast routing protocols like Distance Vector Multicast Routing Protocol (DVMRP) [2], Multicast Open Shortest Path First (MOSPF) [3], Core-Based Trees (CBT) [4] and Protocol-Independent Multicast (PIM) [5] have been proposed for Internet Protocol (IP) multicast routing in fixed networks. However, these protocols are not able to perform well in highly mobile and topology changing scenarios such as ad hoc networks. The main reason is that their forwarding structures are fragile. Thus, the cost in terms of the control overhead which they would require to recompute their multicast trees whenever one of the links in the tree breaks, makes unreasonable their deployment in a mobile ad hoc network.

Several multicast routing solutions specifically designed for ad hoc networks have been proposed in the literature [6]. In general, these protocols can be classified into two groups: tree-based and mesh-based approaches. Tree-based schemes construct a multicast tree from each of the sources to all the receivers. Examples of protocols following this approach are Ad-hoc. Multicast Routing protocol utilizing Increasing id-numberS (AMRISU) [7], Multicast Ad Hoc On-Demand Distance Vector (MAODV) [8], Lightweight Adaptive Multicast (LAM) [9] and Adaptive Demand Driven Multicast Routing (ADMR) [10]. The main advantage of using a tree as the underlying forwarding structure is that the number of forwarding nodes tends to be reduced (although not necessarily optimized). However, a tree is very fragile when there is a high mobility in the network. Mesh-based approaches like On-Demand Multicast Routing Protocol (ODMRP) [11] and Core-Assisted Mesh Protocol (CAMP) [12], by using additional links in their underlying forwarding structure, manage to deal with mobility very efficiently. The main drawback of using a mesh is that, due to the additional paths which are created, duplicated data packets can make an excessive consumption of network resources even if a duplicate detection is used. The usual metrics used in the literature to assess the effectiveness of a multicast ad hoc routing protocol are usually related to the control packet overhead. Previous studies have generally neglected the huge impact that the data overhead may have in the overall performance of a protocol. In fact, if we take into account that data traffic consumes more bandwidth than control traffic, the overhead due to the selection of suboptimal routes may easily become more expensive in terms of bandwidth and energy consumption than the cost of sending a few more control packets.

Data Overhead in Ad Hoc Multicast Routing

The goal of multicast routing protocols in ad hoc networks is finding a set of relay nodes so that data packets sent out by multicast sources can be delivered to multicast receivers. Obviously, the number of those relay nodes is lower than the number of nodes except in the case of flooding.

The paths defined by the union of all these nodes may resemble different forwarding structures such as shortest path trees, shared trees, minimal Steiner trees, acyclic meshes, etc. In general, the underlying forwarding structure is protocol-specific because it strongly depends on the path creation process implemented by that particular protocol. We define forwarding nodes as those nodes which are in the path between any source and any receiver. Note that even a source or a receiver can also be a forwarding node. FIG. 1 shows a multicast tree in which we identify forwarding nodes by a double circle. Wider lines represent the forwarding structure induced by the forwarding nodes.

There are two basic approaches to build multicast trees: shortest path trees and shared trees [18]. Given a multicast source s, a shortest path tree is formed by the aggregation of the shortest paths from any receiver r to s. The main advantage of this kind of tree is that each destination receives multicast data through its best route, which usually means that the latency from s to each r is also minimized. However, these trees are not optimal in terms of the overall number of transmissions required or the number of forwarding nodes which are required. So, they do not provide optimal bandwidth consumption.

A second variant are the so-called shared trees. Shared trees try to reduce the cost of the multicast tree by reducing the number of links which are required to connect sources and receivers. This is done by selecting the links in the tree which can be used by a bigger number of receivers. Of course, in the resulting tree, individual paths from sources to receivers might not be optimal. For the particular case of ad hoc networks, other approaches like the use of multicast meshes with redundant links have been proposed in protocols like ODMRP [11] and CAMP [12]. These structures are particularly interesting to deal with mobility of the nodes, but obviously they do not minimize the cost of multicast forwarding.

The problem of finding a minimum cost multicast tree is well-known as the minimum Steiner tree problem. Karp [19] demonstrated that this problem is Nondeterministic Polynomial (NP)-complete even when every link has the same cost, by a transformation from the exact cover by 3-sets. There are some heuristic algorithms to compute minimal Steiner trees. For instance, the Minimal Steiner Tree (MST) algorithm ([20, 21]) provides a 2-approximation, and Zelikovsky [22] proposed an algorithm which obtains an 11/6-approximation. However, given the complexity of computing these kinds of trees in a distributed way, most of the existing multicast routing protocols use shortest path trees, which can be easily computed in polynomial time. For mesh-based forwarding, the multicast mesh is usually computed as the union of various shortest path trees.

However, the problem of minimizing the cost of a multicast tree in an ad hoc network needs to be re-formulated in terms of minimizing the number of data transmissions. Given the broadcast nature of wireless ad hoc networks, a minimum Steiner tree does not minimize the cost of the multicast tree. The cost assignment function used in wired networks is not well-defined for ad hoc networks. That is, by assigning a cost to each link of the graph, existing formulations have implicitly assumed that a given node v, needs k transmissions to send a multicast data packet to k of its neighbors. However, in a broadcast medium, the transmission of a multicast data packet from a given node v to any number of its neighbors can be done with a single data transmission. Thus, in ad hoc networks the minimum cost tree is the one which connects sources and receivers by issuing a minimum number of transmissions.

FIG. 2 shows different multicast trees connecting the source (S) to the set of receivers (R). As it is depicted in FIG. 2($a$), the union of the shortest path trees results in 3 forwarding nodes. Thus, number of transmissions is 4, one performed by the multicast source and one for each of the forwarding nodes. Similarly, the number of transmissions for the Steiner tree (see FIG. 2($b$)) is also 4. We can see from FIG. 2($b$), how the Steiner tree tries to minimize the number of non-terminal nodes (i.e. nodes which are not either senders or receivers) which take part in the tree. These nodes are also known as Steiner nodes. Finally, we see in FIG. 2($c$) that the minimal data overhead tree, which takes into account the broadcast medium of the network, is able to cover all the receivers with only 3 transmissions. This shows that the Steiner tree problem fails to provide the minimal cost multicast tree in these networks.

Several protocols have been proposed for multicast routing in mobile ad hoc networks. They can be classified into tree or mesh-based depending upon the underlying forwarding structure that they use. Tree-based schemes [7-10, 13] construct a multicast tree from each of the sources to all the receivers using any of the tree computations schemes, discussed in more detail below. Mesh-based approaches [11, 12], compute several paths among senders and destinations. Thus, when the mobility rate increases they are able to tolerate link breaks better than tree-based protocols. Hybrid approaches [14, 15] try to combine the robustness of mesh-based ad hoc routing and the low overhead of tree-based protocols. Finally, there are stateless multicast protocols [16, 17] in which there is no need to maintain a forwarding state on the nodes. For instance, if the nodes to traverse are included in the data packets themselves. The heuristic proposed herein is mainly targeted to mesh-based multicast routing protocols and we therefore focus our discussion on the protocols falling in this category.

ODMRP [11] and CAMP [12] are the best-known mesh-based multicast ad hoc routing protocols. CAMP was designed as an extension of the "Core Based Trees" (CBT [4]) protocol, offering multiple paths, and relieving the core nodes from doing data forwarding. On the other hand, ODMRP introduces the concept of the forwarding group (FG) as the set of intermediate nodes taking part in the multicast mesh. Both of them are able to achieve very high packet delivery ratios, and they both guarantee that the shortest paths are included in the multicast mesh. However, they do not attempt to minimize the data overhead incurred by not selecting minimal cost paths. Most of the works in the literature dealing with the problem of minimizing the costs of multicast trees are related to wired multicast routing. There are many works which propose approximations to Steiner trees. For instance, Jia [27] proposed a distributed heuristic for the Steiner tree problem being able to provide suboptimal multicast trees satisfying certain delay bounds. Waxman [28] also provided two approximation algorithms to the Steiner tree problem in the static case. Chen et al. [29] proposed approximation algorithms to minimize the number of Steiner nodes. However, these proposed approximations are not useful for mobile ad hoc networks because minimal Steiner trees are very fragile to topology changes.

For ad hoc networks, most of the works in the literature devoted to the improvement of multi-point forwarding efficiency for routing protocols have been related to the particular case of flooding (i.e. the broadcast storm problem). Only a few papers study those mechanisms for multicast ad hoc routing. Lim and Kim [30] analyzed the problem of minimal multicast trees in ad hoc networks, but they defined several heuristics based on the minimum connected dominating set (MCDS) which are only valid for flooding. Lee and Kim [31] worked on a solution to reduce the number of forwarding nodes using a probabilistic approach. However, the overhead reductions were lower than the results according to the present invention, discussed below, and their fixed path selection probability makes their proposal unable to perform well under different mobility rates.

SUMMARY OF THE INVENTION

In accordance with the present invention, the problem of creating multicast forwarding structures minimizing data overhead is analyzed. It is shown that forwarding structures used by existing ad hoc multicast routing protocols such as shortest path trees (SPT), multicast meshes or minimal Steiner trees (MST) do not offer minimal data overhead. In particular, mesh-based multicast routing protocols are analyzed because of their suitability for mobile scenarios. The problem of finding a multicast mesh which yields the minimal data overhead is NP-complete, and therefore a heuristic is proposed to approximate minimal data overhead forwarding meshes. The proposed heuristic is based on the epidemic propagation of the number of forwarding nodes during the process of creating multicast paths. In this way, ad hoc nodes are provided with the information required to select between a shortest one or a low data-overhead one. In addition, an adaptive mobility-aware mesh construction algorithm is proposed based on a probabilistic path selection function. The function is defined so that low data-overhead paths are selected with a higher probability when there are enough backup links in the current mobility conditions of the network. When more reliability is needed the function assigns a lower probability to the low data-overhead paths.

Simulation results show that the proposed approach, when incorporated into the ODMRP mesh-based ad hoc routing protocol, yields around a 20 to 50% improvement in the forwarding efficiency. In addition, it achieves a reduction of the mean delivery latency due to the reduced link layer contention while still offering similar packet delivery ratios to the original ODMRP.

BRIEF DESCRIPTION OF THE DRAWINGS

The invention will now be described by way of the drawings, in which:

FIG. 1 shows a graphic example of a tree-based multicast forwarding architecture;

FIGS. 2(a), 2(b) and 2(c) show differences in cost for several multicast trees over the same ad hoc network;

FIG. 3 shows a graph of packet delivery ratio versus mean link duration;

FIG. 4 shows a three dimensional graph of values for probabilistic path selection with respect to number of sources and mean link duration; and FIGS. 5(a), 5(b), 5(c) and 5(d); 6(a), 6(b), 6(c) and 6(d); and 7(a), 7(b), 7(c) and 7(d) show graphs of packet delivery ratio, normalized packet overhead, forwarding efficiency, and latency for differing conditions, respectively, with different numbers of sources and receivers, and using different protocols.

DETAILED DESCRIPTION OF THE INVENTION

Network Model and Problem Formulation

We now provide formal definitions of data overhead and minimal data overhead trees. In addition, we give a formulation for the problem of finding a minimal data overhead multicast mesh, and we demonstrate that the problem is NP-complete.

A. Network Model

We represent the ad hoc network as an undirected graph $G=(V,E)$ where V is the set of vertices and E is the set of edges. We assume that the network is two dimensional (every node $v \in V$ is embedded in the plane) and mobile nodes are represented by vertices of the graph. Each node $v \in V$ has a transmission range r. Let $dist(v1,v2)$ be the distance between two vertices $v1;v2 \in V$. An edge between two nodes $v1;v2 \in V$ exists iff $dist(v1;v2) \leq r$ (i.e. v1 and v2 are able to communicate directly). In wireless mobile ad hoc networks some links may be unidirectional due to different transmission ranges. However, given that lower layers can detect and hide those unidirectional links to the network layer, we only consider bidirectional links. That is, $(v1,v2) \in E$ iif $(v2,v1) \in E$.

The set of all multicast sources and receivers is denoted by V' ($V' \subseteq V$). More precisely, V' is defined as $R \cup S$ where R is the set of multicast receivers and S is the set of multicast sources.

B. Defining Data Overhead

Before formulating the problem of computing the minimal data overhead multicast mesh, we give some definitions.

Definition 1

Given a multicast tree T, we can define the number of transmissions required to deliver a multicast datagram from the source to all the receivers in T as a function $C:T \rightarrow Z+$. We denote by $C(T)$ the number of such transmissions.

Definition 2

Given a graph $G=(V,E)$, a multicast source $\{s\} \in V$, and a set of receivers $R \subseteq V$, we denote by $T^* \subseteq G$ the multicast tree satisfying that $C(T^*) \leq C(T)$ for every possible multicast tree $T \subseteq G \cdot T^*$ is the multicast tree requiring the minimal number of transmissions.

Definition 3

Given a multicast tree T we define the data overhead of T as $\omega_d = C(T) - C(T^*)$. It is immediate from this definition that $\omega_d(T^*)=0$. In addition, it is also easy to show that the minimal multicast tree in terms of number of transmissions is also the minimal data overhead multicast tree.

The previous definition can also be extended for multicast meshes. However, before that, we need an additional definition and the following theorem.

Definition 4

Given a graph $G=(V,E)$ and a multicast mesh $M \subseteq G$ (i.e. a subgraph of G formed by the sources, the receivers and the forwarding nodes), we can define the number of transmissions required to deliver a multicast datagram from each of the sources to all the receivers in a mesh M as a function $C':M \rightarrow Z+$. We denote by $C'(M)$ the number of such required transmissions in the mesh M. In addition, given the set of forwarding nodes $F \subseteq V$, and the set of sources $S \subseteq V$, $C'(M) = |Sj| \times (1+|F|)$. That is, provided that in a multicast mesh a forwarding node sends each multicast data packet only one time, the number of transmissions for each source is the one for the source itself plus one for each forwarding node.

Theorem 1

Given a graph $G=(V,E)$, a set of multicast sources $S \subseteq V$, and a set of receivers $R \subseteq V$, the minimal number of transmissions required to deliver a datagram from each of the sources to all the receivers is $\Sigma_{i=1}^{|S|} C(T_i^*)$ being $T_i^*$ the minimal data overhead multicast tree for each source $i \in S$.

Proof:

Lets assume that there is a minimal number of transmissions mesh (or shared tree) T' which connects all sources and receivers so that $$C(T') < \sum_{i=1}^{|S|} C(T_i^*)$$

Let F be the set of forwarding nodes in T'. Then, by definition 4, $C(T')=|S| \times (1+|F|)$. Let $T_{max}^*$ be minimal data overhead tree with the bigger number of transmissions. That is, $C(T_{max}^*) \geq C(T_{max}^*)$ for every source $i \in S$. The number of forwarding nodes in $T_{max}^*$ is then $C(T_{max}^*)-1$. Given that $T_{max}^*$ is the minimum number of transmissions tree for one of the sources, and provided that T' also contains that source, then $|F| \geq C(T_{max}^*)-1$. This means that the following relation holds:

$$1+|F| \geq C(T_{max}^*) \tag{1}$$

However, by definition of T' our initial assumption should be satisfied. This is equivalent to say that the following relation should hold $$|S| \times (1+|F|) < \sum_{i=1}^{|S|} C(T_i^*)$$

But this can only happen if $1+|F|<C(T_i^*)$ for every source $i \in S$. Which is a contradiction provided that $1+|F| \geq C(T_{max}^*) \geq C(T_{max}^*)$, $i=1 \ldots |S|$ Using the previous theorem, we can give the following definition of data overhead for a multicast mesh.

Definition 5

Let $G=(V,E)$ be a graph, $S \subseteq V$ be a set of sources, and $R \subseteq V$ be a set of receivers. Let $T^*=\{T_1^*, T_2^*, \ldots; T_i^*; \ldots; T_{|S|}^*\}$ be the set of trees containing the minimal data-overhead multicast tree for each of the sources. Let $M \subseteq G$ be a multicast mesh and let F be the set of forwarding nodes in M. The data overhead of M can be defined as:

$$\omega_d(M) = |S| \times (1+|F|) - \sum_{i=1}^{|S|} C(T_i^*) \quad (2)$$

The left-hand term of the subtraction in (2) is obtained from the fact that in a multicast mesh every forwarding node makes a single transmission of each data packet generated by any of the sources. The right-hand term is simply the minimal number of transmissions required to deliver a message from each of the sources to all the receivers (as proved by theorem 1). In addition, combining definition 4 and theorem 1 we can also introduce the following corollary.

Corollary 2

A multicast mesh M connecting several sources and receivers does not offer the minimal data overhead. The proof is immediate by substituting the inequality (1) in (2) to show that $\omega_d(M) \geq 0$.

C. Problem Formulation

Although a multicast mesh does not offer the minimal number of transmissions, multicast meshes are very interesting for multicast ad hoc routing due to their reliability. However, it is of paramount importance to be able to control their data overhead.

Thus, it makes sense to consider the problem of finding minimal data overhead multicast meshes. This particular problem can be formulated as follows: Given a graph $G=(V,E)$ and a set of nodes $V'=R \cup S$ so that $V' \subseteq V$, find the smallest set of nodes $X \subset G$ such that the following conditions are satisfied:

(1) $X \supseteq S$
(2) $G_X$ is connected
(3) $G_X$ is a vertex cover for R

Condition (1) means that X must contain at least all the sources. This is because we want X to be the set of all nodes performing multicast transmissions or forwardings. Thus, at least all the sources should be in X and eventually, other nodes required to connect sources and receivers will also be in X. Condition (2) requires that the subgraph induced by the set of nodes X in G, denoted by $G_X$ is connected. This means that there is at least one path in $G_X$ connecting every source and every receiver. Finally, condition (3) states that given any node r ∈R, there is a node x∈X so that dist(x, r)≤1. In other words, it means that every receiver is at no more than 1 hop from one of the nodes sending or forwarding multicast packets. Note that in the particular case in which a receiver $r_j \in R$ belongs to X the condition still holds because in that case $dist(r_j, r_j)=0<1$. Note that by finding the smallest set of nodes X we are inherently asking for the induced subgraph with the minimal $C(G_X)$. In addition, as $G_X$ is a mesh, that also means minimizing $\omega_d(G_X)$.

D. NP-Completeness

We demonstrate through the following theorem that the problem of finding a minimal data overhead multicast mesh is NP-complete.

Theorem 3

Given $G=(V,E)$ and $V' \subseteq V$ so that $V'=R \cup S$, the problem of finding the smallest X so that $X \supseteq S$, $G_X$ is connected and $G_X$ is a vertex cover of R, is NP-complete.

Proof:

We consider a special case of our problem in which R=V−S. For this particular case given $S \subseteq V$, we are interested in finding the smallest $X \supseteq S$ which covers (V−S). This is equivalent to say that we are looking for the smallest $X \supseteq S$ such that for any vertex v∈V, dist(v,X)≤1.

Given a graph $G=(V,E)$, the problem of finding the smallest $X \subseteq V$ such that dist(v,S)≤1 for any v∈V is the well known vertex cover problem. This problem, which is NP-complete [23], is thus a special case of our problem when R=V−S. Then, we can conclude that our original problem is also NP-complete.

Heuristic for Minimal Data Overhead Meshes

Given the NP-completeness of the problem of finding the minimal data-overhead multicast mesh, we propose use of a heuristic algorithm. In addition, we justify the validity of the proposed approach.

A. Proposed Heuristic

From the definition the data overhead of a multicast mesh given in definition 5, it is clear that minimizing the data overhead of a multicast mesh, requires the minimization of the expression $|S| \times (1+|F|)$. The number of sources ($|S|$) is something the routing protocol cannot change. So, the only way to reduce the overhead of a multicast mesh is reducing the number of forwarding nodes ($|F|$) which are used.

From this observation, we provide a distributed heuristic to approximate the minimal data overhead multicast mesh by reducing the number of forwarding nodes which are required to connect multicast sources and receivers. The proposed algorithm (see algorithm 1) is a distributed counting process inspired on epidemic algorithms. Basically, a counter is added to route request (RREQ) messages. A multicast source initially sets this counter to zero. During the propagation of RREQ messages throughout the ad hoc network, this counter is modified by intermediate nodes to reflect the number of non-forwarding nodes in their path to that multicast source. So, this counter (denoted by FNCount) computes the number of new forwarding nodes which would be added to the multicast mesh if that particular path is selected. By giving more preference to those routes with the lower FNCount, ad hoc nodes can reduce the data overhead and the resulting multicast mesh will be an approximation to the minimal data overhead multicast mesh.

As algorithm 1 shows, the way in which an intermediate node updates the FNCount field is very simple and intuitive:

If the node is not a forwarding node, then increment the counter.

If the node is a forwarding node, do not increment the counter.

If the node is a receiver and a multicast forwarder, set the counter to zero. If it is only a receiver then set the counter to one.

The latter case in which the node is a receiver has been defined in that way to reflect that the receiver will have to join the source through its lower FNCount route anyway. So, every intermediate node in that route will become a multicast forwarder. Thus, the multicast receiver acts as if he would have received a best route with an FNCount of zero.

The use of the proposed heuristic produces multicast meshes in which there is a very low redundancy. Although that is excellent from the point of view of the data overhead reduction, the performance in mobile environments may suffer a noticeable degradation because the minimal mesh is less resilient to topological changes. However, our interest in the minimal data overhead multicast mesh stems from the possibility of being able to control the reliability of the underlying mesh, by simply adding or reducing links to that minimal mesh depending on the mobility of the network.

We also propose an adaptive and mobility-aware mesh construction algorithm based on the principle of adjusting the reliability of the minimal data overhead multicast mesh to the changing conditions of the network.

Algorithm 1 Minimal Data Overhead Mesh Heuristic

```
1: BestRREQ null
2: loop
3:    Receive route request packet RREQ
4:    if RREQ.seqno > BestRREQ.seqno then
5:       BestRREQ RREQ
6:       if forwarder node and not receiver then
7:          NewRREEQ.FNCount RREQ.FNCount
8:       else if forwarder node and receiver then
9:          NewRREQ.FNCount 0
10:      else if not forwarder and receiver then
11:         NewRREQ.FNCount 1
12:      else
13:         NewRREQ.FNCount RREQ.FNCount+1
14:      end if
15:      Schedule sending of NewRREQ
16:   else if RREQ.seqno = BestRREQ.seqno and RREQ.FNCount <
      BestRREQ.FNCount then
17:      if NewRREQ not sent out yet then
18:         BestRREQ RREQ
19:         if forwarder node and not receiver then
20:            NewRREQ.FNCount RREQ.FNCount
21:         else if forwarder node and receiver then
22:            NewRREQ.FNCount 0
23:         else if not forwarder and receiver then
24:            NewRREQ.FNCount 1
25:         else
26:            NewRREQ.FNCount RREQ.FNCount+1
27:         end if
28:      end if
29:   end if
30: end loop
```

Mobility-Aware Mesh Construction Algorithm

Improving the forwarding efficiency of a multicast ad hoc routing protocol without an impairment in the protocol's performance requires a trade-off between reliability and data overhead. When the mobility rate in the network is high, it is interesting to count on the additional paths created when the number of forwarding nodes is increased. However, in scenarios with a lower mobility, having a big number of forwarding nodes is usually a waste of resources provided that there are few topological changes and most of the additional paths are not required. Thus, a mesh-based multicast ad hoc routing protocol can benefit from being able to adaptively adjust the number of forwarding nodes which are created according to the network conditions. To achieve that, we introduce a probabilistic route selection scheme based on the heuristic described in the previous section. Depending on the network conditions, the probability of selecting the paths producing a lower data overhead or those incrementing the reliability of the mesh are adjusted.

A. Network Metrics Under Consideration

An adaptive routing scheme requires some feedback about the network conditions to properly adapt its behavior. One of the key network parameters which influences the protocol's performance is the stability of the network. There are several mobility metrics which can be considered. Examples are the mean duration of the paths, the link change rate and the link duration among others. The duration of a link is defined as the mean number of time units that the link is up during a certain time window. Thus, the mean link duration is defined as average of the link durations of all the links of a node. This metric is particularly interesting as it can be easily computed by a node in real scenarios using only local information (i.e. and without the need for additional equipment or location information such as Global Positioning System (GPS)). In addition, Boleng et al. [24] showed that link duration is much more interesting than previous mobility metrics used in the literature. They showed that the link duration and the packet delivery ratio for unicast ad hoc routing protocols are strongly correlated. In fact, other metrics such as the link break rate were not able to achieve such a big degree of correlation. That is why the mean link duration is selected as the mobility metric to use.

One of the key parameters affecting the computation of the link duration is the time window under consideration. If the time window is too large, old links may very much influence the mean link duration, causing the feedback not to be very responsive. If the time window is too small, the link duration might fluctuate very much, without capturing the stability effect of long lived links. The determination of a proper time window was not addressed in [24]. However, from simulation results it has been found that a value of 120 seconds appears to be a good trade-off. In addition, no additional control messages (e.g. beacons or HELLOs) are employed to compute mean link durations. Simply the control and data messages that the routing protocol would send anyway to assess the status of individual links are employed. So, there is no need for extra overhead when using this approach, and the measurements are accurate enough.

Unfortunately, the studies in [24] did not consider the case of multicast ad hoc routing. Moreover, they did not consider the case of mesh-based routing in which additional paths may help at reducing the effects of mobility. So, the relation between the packet delivery ratio and the link duration when using a multicast mesh was evaluated. To make that evaluation ODMRP challenged with the minimal data overhead mesh heuristic introduced before as the routing protocol was used. The results in FIG. 3 show that trying to fit a curve doing regression as the authors did in [24] gives a considerable fitting error, compared to the 98.5% coefficient of determination which they obtained. This indicates that there are other parameters in addition to the link duration which influence the packet delivery ratio in mesh based ad hoc routing.

The key difference with the unicast case (and the results of Boleng et al.) are due to the additional reliability which a multicast mesh provides. In mesh-based multicast routing in which redundant links or paths may exist, the link duration alone is not responsible for the differences in packet delivery ratios. For instance, given two scenarios with the same link durations, the one with the higher reliability can obtain a bigger packet delivery ratio. So, in addition to the link duration we need to consider another easy-to-compute metric to estimate the existing reliability that the multicast mesh already has.

It has been found that the number of multicast sources has a strong correlation with the number of forwarding nodes. It is very easy to compute, and found to have a much better coefficient of determination can be obtained when considering independently the link duration correlation with the packet delivery ratio for each number of multicast sources. This is explained by the fact that as the number of sources increase, so does the number of forwarding nodes. Thus, the greater the number of sources, the higher the reliability of the multicast mesh. By considering both the link duration and the packet delivery ratio, the amount of additional reliability which the minimal data multicast mesh requires can be estimated. Concretely, a probability value which influences the probabilistic selection of the paths is estimated. Details about the probabilistic path selection are now described.

B. Adaptive Mesh Construction

The design of a deterministic mesh construction algorithm being able to balance the data overhead according to the network conditions, is very difficult. It requires the consideration of scenario-specific or overall network metrics which are usually difficult or expensive to obtain. In these cases, it is often more interesting to the use probabilistic schemes which can work with lossy or partial information and still provide good results in terms of performance.

We thus build the multicast mesh by extending the minimal data overhead mesh according to the mobility of the network and considering the innate reliability that the minimal mesh already has. So, we can differentiate two different components affecting the probabilistic path selection: the mobility and the existing reliability in the minimal mesh. For the first component we use the mean link duration as a relevant metric. The number of multicast sources is used for the latter component. The probabilistic mesh construction is based on the minimal data overhead mesh construction algorithm depicted in algorithm 1. When a node receives a route request (RR), instead of selecting every time the route with the lower FNCount, it will select the route with the lower FNCount with a certain probability $\pi_s$. By adjusting the value of $\pi_s$ we can control whether the selected paths are those adding reliability or those reducing data overhead. A bigger value of $\pi_s$ reduces data overhead while a lower value of $\pi_s$ increases reliability. Key to this, is to find a suitable probability assignment function $\pi$ defined in the interval [0,1] such that given a link duration ld and given a number of multicast sources |S|, $\pi$(ld, |S|)=$\pi_s$ ends up generating the required amount of redundancy.

In order to compute a suitable function $\pi$, we focus on finding appropriate functions $\pi_1$(|S|) and $\pi_2$(ld), which we shall later combine to find the probability assignment function $\pi$.

B.1 Finding a Function for $\pi_1$(|S|)

If we consider the minimal data overhead multicast mesh, we are interested in analyzing the rate at which the number of new forwarding nodes increases as the number of sources is augmented. Let S={$s_1, s_2, \ldots s_n$} be the set of multicast sources. Let $M_i$ be the forwarding mesh obtained when the source $s_i$ is considered individually, and let $F_i$ be the set of forwarding nodes of Mi. Then, if we consider the overall multicast mesh produced when considering all the n sources, $M^n = M^1 \oplus M^2 \oplus \ldots \oplus M^n$, the number of forwarding nodes in $M_n$ denoted as $|F_n|$ can be recursively defined as $$|F^n| = |F_n| + |F^{n-1}| - |F_n \cap F^{n-1}|$$

Obviously, the new number of forwarding nodes added is $$|F^n| - |F^{n-1}| = |F_n| - |F_n \cap F^{n-1}|$$

So, given a fixed set of receivers R, a multicast mesh has a higher resilience as the number of sources increases, but the increasing rate is not linear. The bigger the number of sources, the lower will be the number of new forwarding nodes added. This is because for each forwarding node f∈$F_i$ the probability of the event that that node was already considered in the mesh for any other source $M_j$, j≠i is increased. So, $\pi_1$(|S|) should be monotonously decreasing with a lower decreasing rate as |S| increases. By simulating different possible functions we found that a good approximation was given by (3).

$$\pi_1(|S|) = \frac{1}{1 + |S|^2} \quad (3)$$

B.2 Finding a Function for $\pi_2$(ld)

From our simulation results of the minimal data overhead mesh, the packet loss ratio for different link durations was computed. This ratio yields an approximation of the additional reliability which would have been required to deliver all the messages. This function, which is the inverse of the fitting function in FIG. 3, showed the exponential nature of the target function, being $\pi_2$(ld)~$e^{-\alpha \times ld}$. Through simulation we found that the value of α was, as expected, dependent on the number of sources. For a higher number of sources, the needed reliability was lower because of the additional paths in the mesh.

So, by further simulating combinations of $\pi_1$(|S|) and $\pi_2$(ld) with varying α, we found the function in (4) to be appropriate. In fact, this function, which is plotted in FIG. 4, meets all our requirements. As the number of sources increases, π(ld; |S|) decreases. As the link duration decreases π(ld; |S|) increases. And finally, when the number of sources provides enough reliability the contribution from the mobility metric is lower than when there are a few sources.

$$\pi(ld, |S|) = \frac{1}{1 + |S|^2} \times \left(1 + e^{\frac{-ld}{58}}\right) \quad (4)$$

The integration of this approach into ODMRP is very straightforward, and the increase in control overhead is negligible. The only extensions are:

(i) adding a new field to JOIN_QUERY messages in which the FNCount field is being updated, (ii) changing the route selection algorithm to use π(ld; |S|) according to (4) and (iii) make a node wait J_QUERY_AGG time to eventually receive a better data-overhead route before propagating JOIN_QUERY messages.

Simulation Results

In order to assess the effectiveness of the proposed schemes, the proposed changes were implemented into the original ODMRP code from the Monarch extensions [26] to the NS-2[25]. ODMRP has been selected as the mesh-based multicast routing protocol because it is very well-documented in the literature where it is shown to offer very good performance results.

Table 1 summarizes ODMRP parameters which have been used for the simulations. They are the standard values except for the J_QUERY_AGG parameter which has been introduced only for the particular case of the proposed modifications.

TABLE 1

ODMRP Parameters for simulation

| Parameter | Meaning | value |
|---|---|---|
| REF_INTERVAL | Time between JQ floodings | 3 s |
| FG_TIMEOUT | Timeout for the FG_GLAG | 9 s |
| J_REPLY_RET | Max # of J. REPLY retransmissions | 3 |
| J_REPLY_AGG | Timeout for aggregation of J. REPLY's | 0.025 s |
| J_QUERY_AGG | Timeout for aggregation of J. QUERY's | 0.015 s |

A. Simulation Methodology and Performance Metrics

The simulated scenario consists of 100 mobile nodes randomly distributed over an area of 1200×800 m², moving according to a random waypoint model at a speed uniformly distributed between 0 and 20 m/s. The rest of the simulation parameters used, are described in Table 2.

TABLE 2

Simulation parameters

| | |
|---|---|
| MAC layer | IEEE 802.11b DCF at 2 Mb/s |
| Comm. range | 250 m |
| Sim. time | 900 s |

TABLE 2-continued

Simulation parameters

| | |
|---|---|
| Traffic | 1, 2, and 5 CBR sources, 330 bytes/pkt, 5 pkt/s |
| Receivers | 5, 15 and 30 |

To assess the effectiveness of the different protocols, we have used the following performance metrics:

Packet delivery ratio. Defined as the number of data packet successfully delivered over the number of data packets generated by the sources.

Normalized packet overhead. Defined as the total number of control and data packets sent and forwarded normalized by the total number of packets successfully delivered.

Forwarding Efficiency. The mean number of times that a multicast data packet was forwarded by the routing protocol. This metric represents the efficiency of the underlying forwarding structure.

Mean delivery latency. The mean of the latencies for a data packet at the different receivers. The mean delivery latency is then the average of these mean latencies over all the data packets.

B. Performance Evaluation

The data labeled as 'DMRP' corresponds to the original ODMRP protocol. The minimal data overhead heuristic is labeled as 'DMRP-NF'. The adaptive mesh construction using only the number of sources is labeled as 'DMRP-NS' and the mobility-aware mesh construction approach is labeled as 'DMRP-LD'.

The packet delivery ratio as a function of the pause time is depicted in FIG. 5(a) for the four variants in the 1 source and 15 receivers scenario. As expected, the minimal data overhead mesh heuristic yields around a 10% lower packet delivery ratio compared to ODMRP. That is due to the lack of redundant links. However, both ODMRP and the adaptive variants are able to deliver around 99% of the packets. ODMRP delivers around a 0.5% more packets than the mobility-aware approach. However, to achieve this packet delivery ratio, the original ODMRP version requires around a 20% more forwarding nodes (see FIG. 5(c)). In addition, the proposed alternative has a lower overhead. As we can see, the minimal data overhead mesh heuristic uses a 60% less overhead than ODMRP. This is because by reducing the number of forwarding nodes, the data overhead is also reduced. An additional benefit of reducing the data overhead is the reduction of the mean latency between the source and the receivers. The expected behavior is that ODMRP would have offered a lower latency because it uses the shortest path tree. However, the proposed approach by reducing the number of forwarding nodes also reduces the MAC-layer contention and collisions among forwarding nodes. Thus, the overall average latency can be reduced.

It is also interesting to point out, that the mobility-aware heuristic by considering the mean link durations is able to offer higher packet delivery ratios than the same heuristic considering only the number of sources. This is particularly noticeable for the scenarios with lower pause times.

The cause for the important difference in the number of forwarding nodes between the different variants is that in the original ODMRP the randomness in the access to the MAC layer can make the shortest path routes to change very quickly even if the topology is relatively static. This is because ODMRP considers the path from which the JOIN_QUERY is first received to be the shortest path. Thus, provided that after a new route has been selected the forwarding nodes in the old path will still remain active for two additional refresh intervals, the number of forwarding nodes quickly increases. This means that ODMRP has a higher reliability which is obtained at the cost of increasing data overhead. The proposed schemes are based in the lower FNCount metric, which does not change as fast as the shortest path. Thus, the number of nodes can be reduced. In fact, in the case of the mobility-aware algorithm, the data overhead can be controlled by the selection of appropriate $\pi_s$ for the probabilistic path selection. That is why 'ODMRP-LD' has a bigger data overhead when the network is less static (lower pause times) and the number of forwarding nodes reduces as the pause times increase.

The performance results are very similar in the scenarios for 5 and 30 receivers. In general, the higher the number of receivers, the lower the differences in the packet delivery ratio and also the lower the differences in data overhead. This is because as the number of receivers increases, so does the number of forwarding nodes which are really needed.

The evaluation of the scenarios with 2 sources and 15 receivers in FIG. 6 shows a similar trend. The packet delivery ratio of the mobility-aware approach is still around 0.5% lower than ODMRP. Moreover, the proposed approach becomes even more efficient compared to the original ODMRP. In FIG. 6(c) it is shown that the proposed approach manages to improve the forwarding efficiency by around a 50%. Given that in these scenarios the traffic load is doubled, both approaches experience a slight increase in the average latency. This is due to the higher contention at the MAC-layer. However, as FIG. 6(d) depicts, the proposed approach improves even more its average latency compared to the one of the original ODMRP. This is explained by the 50% less forwarding nodes required by the proposed approach. Similar results were obtained for the case of 5 and 30 receivers. For the case of the minimal data overhead heuristic scheme, the differences in the packet delivery ratio compared to ODMRP are reduced to a 2.5% for the scenarios with a higher mobility and around a 1% for more static scenarios. This corroborates our studies in the previous section about the additional reliability automatically added to the multicast mesh by increasing the number of sources. In addition, by comparing 'ODMRP-LD' and 'ODMRP-NS' we can see that in this case the mobility-aware approach stills performs better under high mobility, but the differences in overhead are much lower. This is because the definition of $\pi(ld, |S|)$ takes advantage of the additional reliability provided by having two sources.

In the scenarios with 5 multicast sources, we can see that the traffic load is so high, that the ad hoc network starts getting congested. This can be shown by the reduction in the packet delivery ratio shown in FIG. 7(a) and the increments in latency shown in FIG. 7(d). The congestion for ODMRP is so high for the case of 15 and 30 receivers that we focus here in the case of 5 receivers, which is more representative. In fact, we can notice that the proposed approach improves the packet delivery ratio by 3.5% using a 50% less of data transmissions (see FIG. 7).

CONCLUSIONS

The present invention provides a mobility-aware heuristic algorithm to reduce the data overhead of mesh-based multicast ad hoc routing protocols. The algorithm adapts the number of redundant paths of the multicast mesh to the mobility of the network. It starts with an approximation of the minimal data overhead multicast mesh, and increments or reduces the number of forwarding nodes as required. The NP-completeness of finding such a minimal multicast mesh was determined, which fully justifies the heuristic nature of the proposed scheme.

The proposed scheme was simulated using ODMRP as the baseline protocol. The performance evaluation shows that the mobility-aware mesh construction algorithm achieves similar packet delivery ratios than the original ODMRP protocol with a reduction between 25 to 50% in the number of forwarding nodes and an enhancement in the average latency. The results in scenarios with a high traffic load show that the mobility-aware mesh construction approach is able to achieve a higher overall network capacity. So, the proposed scheme allows mesh-based multicast as hoc routing protocols to benefit from having a low data overhead like the one of multicast trees, while still providing an excellent reliability in face of mobility.

The preferred embodiment of the present invention, improvements, and advanced features, is thus described. While the present invention has been described in particular embodiments, it should be appreciated that the present invention should not be construed as limited by such embodiments, but rather construed according to the below claims.

REFERENCES

[1] S. Deering, "Multicast Routing in a Datagram Internetwork," Ph.D. Thesis, Electrical Engineering Dept., Stanford University, December 1991.
[2] S.-E. Deering and D.-R. Cheriton, "Multicast Routing in datagram internetworks and extended LANs," Transactions on Computer Systems, vol. 8, no. 2, May 1990, pp. 85-110.
[3] J. Moy, "Multicast routing extensions for OSPF," Computer communications of the ACM, vol. 37, no. 8, August 1994, pp. 61-66.
[4] T. Ballardie, P. Francis and J. Crowcroft, "Core Based Trees (CBT)—An architecture for scalable inter-domain multicast routing," Proc. of ACM SIGCOMM'93, San Francisco, Calif., October 1993, pp. 85-95.
[5] S. Deering, D.-L. Estrin, D. Farinacci, V. Jacobson, C.-G. Liu and L. Wei, "The PIM architecture for wide-area multicast routing," IEEE/ACM Transactions on Networking, vol. 4, no. 2, April 1996, pp. 153-162.
[6] C. Cordeiro, H. Gossain and D. Agrawal, "Multicast over Wireless Mobile Ad Hoc Networks: Present and Future Directions" IEEE Network, no. 1, January 2003, pp. 52-59.
[7] C.-W. Wu, Y.-C. Tay and C.-K. Toh, "Ad Hoc Multicast Routing Protocol Utilizing Increasing id-numberS (AMRIS) Functional Specification," Internet-draft, work in progress, draft-ietf-manet-amris-spec-00.txt, November 1998.
[8] E.-M. Royer and C.-E. Perkins, "Multicast operation of the ad-hoc on-demand distance vector routing protocol," Proceedings of ACM/IEEE MOBICOM' 99, Seattle, Wash., August 1999, pp. 207-218.
[9] L. Ji and S. Corson, "A Lightweight Adaptive Multicast Algorithm," Proceedings of IEEE GLOBECOM'98, Sydney, Australia, November 1998, pp. 1036-1042.
[10] J.-G. Jetcheva, D.-B. Johnson, "Adaptive Demand-Driven Multicast Routing in Multi-Hop Wireless Ad Hoc Networks," Proceedings of ACM MobiHoc' 01, Long Beach, Calif., October, 2001, pp. 33-44.
[11] S.-J. Lee, W. Su, and M. Gerla, On-demand multicast routing protocol in multihop wireless mobile networks, ACM/Kluwer Mobile Networks and Applications, vol. 7, no. 6, pp. 441-452, December 2002.
[12] J. J. Garcia-Luna-Aceves and E.-L. Madruga, "The Core-Assisted Mesh Protocol," IEEE Journal on Selected Areas in Communications, vol. 17, no. 8, August 1999, pp. 1380-1394.
[13] C.-K. Toh, G. Guichala, S. Bunchua, "ABAM: On-Demand Associativity-Based Multicast Routing for Mobile Ad hoc Networks," Proceedings of IEEE VTC-2000, Boston, Mass., September 2000, pp. 987-993.
[14] E. Bommaiah, M. Liu, A. MacAuley and R. Talpade, "AMRoute: Ad hoc Multicast Routing Protocol," Internet-draft, work in progress, drafttalpade-manet-amroute-00.txt, August 1998.
[15] P. Sinha, R. Sivakumar and V. Bharghavan, "MCEDAR: Multicast Core-Extraction Distributed Ad hoc Routing," Proc. of IEEE Wireless Commun. and Networking Conf., New Orleans, La., September 1999, pp. 1313-1319.
[16] L. Ji, and M.-S. Corson, "Differential Destination Multicast: A MANET Multicast Routing Protocol of Small Groups," Proc. of IEEE INFOCOM' 01, Anchorage, Ak., April 2001, pp. 1192-1202.
[17] J.-G. Jetcheva, Yih-Chun Hu, David A. Maltz and David B. Johnson, "A Simple Protocol for Multicast and Broadcast in Mobile Ad Hoc Networks," Internet-draft, work in progress, draft-ietf-manet-simple-mbcast-01.txt, July 2001.
[18] K. Bharath-Kumar and J.-M. Jaffe, "Routing to Multiple Destinations in Computer Networks," IEEE Transactions on Communications, no. 31 Vol. 3, 1983, pp. 343-351.
[19] R.-M. Karp, "Reducibility among combinatorial problems," In Complexity of computer computations, Plenum Press, New York, 1975, pp. 85-103.
[20] L. Kou, G. Markowsky, and L. Berman, "A fast algorithm for Steiner trees," Acta Informatica, no. 15, vol. 2, 1981, pp. 141-145.
[21] J. Plesnik, "The complexity of designing a network with minimum diameter," Networks, no. 11, 1981, pp. 77-85.
[22] A. Zelikovsky, "An 11/6-approximation algorithm for the network Steiner problem," Algorithmica, no. 9, 1993, pp. 463-470.
[23] S. Even, "Graph Algorithms," Computer Science Press, 1979, pp. 204-209.
[24] J. Boleng, W. Navidi and T. Camp, "Metrics to Enable Adaptive Protocols for Mobile Ad Hoc Networks", Proc. International Conference on Wireless Networks (ICWN), Las Vegas, Nev., June 2002, pp. 293-298.
[25] K. Fall, K. Varadhan, "ns, Notes and Documentation", The VINT Project, UC Berkeley, LBL, USC/ISI, and Xerox PARC, November 2003.
[26] The Monarch Project, mobile networking architectures, Rice University. [On-line]. Available: http://www.monarch.cs.rice.edu/Ruiz-201.2
[27] X. Jia, "A Distributed Algorithm of Delay-Bounded Multicast Routing for Multimedia Applications in Wide Area Networks," IEEE/ACM Transactions on Networking, vol. 6, no. 6, December 1998, pp. 828-837.
[28] B.-M. Waxman, "Routing of Multipoint Connections," IEEE Journal on Selected Areas in Communications, vol. 6, no. 9, December 1998, pp. 1617-1622.
[29] D. Chen, D.-Z. Du, X.-D. Hu, G.-H. Lin, L. Wang, G. Xue, "Approximations for Steiner trees with minimum number of Steiner points," Theoretical Computer Science no. 262, 2001, pp. 83-99.
[30] H. Lim and C. Kim, "Multicast Tree Construction and Flooding in Wireless Ad Hoc Networks," Proceedings of the 3rd ACM international workshop on Modeling, analysis and simulation of wireless and mobile systems, Boston, Mass., USA. August, 2000, pp. 61-68.
[31] S. Lee, C. Kim, "Neighbor Supporting Ad hoc Multicast Routing Protocol," Proceedings of the 1st ACM MobiHoc', Boston, Mass., USA, 2000, pp. 37-44.

What is claimed is:

1. A method for operating a mobile node of an ad hoc network, comprising:
communicating through a wireless communication interface with a plurality of other mobile nodes;
building a plurality of multicast trees comprising identifications of alternate communication paths; and
routing and hosting communications through a mobile node of an multi-hop ad hoc network along a communication path, using at least a multicast communication through the wireless communication interface dependent on the multicast trees, and probabilistically selecting a respective communication path based on a composite function of at least a reliability metric and a communication data-overhead metric of the respective communication path, so that low data-overhead communication paths are selected with increasing probability with an increasing reliability of the respective communication path.

2. The method according to claim 1, further comprising engaging in an epidemic propagation of a number of available forwarding nodes in order to define communication paths.

3. The method according to claim 1, further comprising constructing a mobility-aware mesh.

4. The method according to claim 3, wherein the adaptive mobility-aware mesh approximates a minimal data overhead forwarding mesh.

5. The method according to claim 1, wherein the reliability metric is a function of at least a link duration associated with the each of the other mobile nodes and a number of available alternate communication paths under current mobility conditions of the mobile ad hoc network.

6. The method according to claim 5, wherein communication paths having a low data-overhead are more probably selected with an increase in a predicted reliability, and communication paths having a short path length are less probably selected with an increase in the predicted reliability.

7. The method according to claim 1, further comprising employing a mobility-aware mesh construction algorithm which employs a heuristic to approximate minimal data overhead forwarding meshes based on an epidemic propagation of a number of forwarding nodes during creation of multicast communication paths, to provide information for selection between alternate communication paths, each communication path characterized by a path length and a path data-overhead.

8. The method according to claim 1, further comprising selecting a respective communication path with a probability inversely related at least e raised to the power of the link duration, and inversely related to the square of the number of alternate communication paths between a source and a destination.

9. The method according to claim 1, further comprising a cost of employing a node, and to select a respective communication path in dependence on at least a cost of the nodes in the communication path.

10. The method according to claim 1, further comprising determining a number of nodes in available communication paths, and preferentially select a communication path having a smaller number of nodes over a communication path having a larger number of nodes.

11. A mobile ad hoc network method, comprising:
automatically communicating wirelessly between a mobile ad hoc network node and a plurality of other mobile ad hoc network nodes through a wireless communication interface;
automatically maintaining, at the mobile ad hoc network node, a plurality of multicast trees defining alternate communication paths; and
automatically hosting and routing communications through the mobile ad hoc network, in dependence on the plurality of multicast trees, wherein a communication path is probabilistically selected based on a composite function of at least a communication reliability metric and a communication data-overhead metric, wherein low data-overhead communication paths are selected with increasing probability with an increasing reliability.

12. The mobile ad hoc network method according to claim 11, further comprising performing epidemic propagation of a number of available forwarding nodes in order to define the alternate communication paths.

13. The mobile ad hoc network method according to claim 11, further comprising constructing an adaptive mobility-aware mesh which approximates a minimal data overhead forwarding mesh.

14. The mobile ad hoc network method according to claim 11, wherein the reliability metric is a function of at least a link duration associated with the each of the plurality of other mobile nodes and a number of available alternate communication paths under current mobility conditions of the mobile ad hoc network.

15. The mobile ad hoc network method according to claim 14, further comprising selecting communication paths having a low data-overhead more probably with an increase in a predicted reliability, and selecting communication paths having a short path length less probably with an increase in the predicted reliability.

16. The mobile ad hoc network method according to claim 11, further comprising performing a mobility-aware mesh construction algorithm employing a heuristic to approximate minimal data overhead forwarding meshes based on an epidemic propagation of a number of forwarding nodes during creation of multicast communication paths, to provide information for selection between alternate communication paths, each communication path characterized by a path length and a path data-overhead.

17. The mobile ad hoc network method according to claim 11, further comprising selecting a respective communication path with a probability inversely related at least e raised to the power of the link duration, and inversely related to the square of the number of alternate communication paths between a source and a destination.

18. The mobile ad hoc network method according to claim 11, further comprising determining a cost of employing a respective mobile ad hoc network node, and selecting a communication path in dependence on at least a cost of the respective mobile ad hoc network nodes in the respective communication path.

19. The mobile ad hoc network method according to claim 11, further comprising determining a number of nodes in available communications paths, and preferentially selecting a communication path having a smaller number of nodes over a communication path having a larger number of nodes.

20. A method for communicating through a mobile ad hoc network, comprising:
providing a mobile ad hoc network node having an automated wireless communication interface configured to support at least communications with a plurality of other mobile nodes;
automatically maintaining a plurality of multicast trees comprising a plurality of alternate communication paths, hosting communications and routing communications in the mobile ad hoc network through the automated wireless communication interface; and automatically selecting communications paths for communication through the mobile ad hoc network from the plurality of alternate communication paths, dependent on at least the multicast trees, a reliability metric and a communication data-overhead metric, wherein low data-overhead communication paths to a communication destination are selected with increasing probability with an increasing reliability of a respective communication path.

* * * * *